US012736969B2

(12) United States Patent
Chadha et al.

(10) Patent No.: US 12,736,969 B2
(45) **Date of Patent: *Sep. 15, 2026**

(54) AUTONOMOUS VEHICLE FLEET MANAGEMENT FOR IMPROVED COMPUTATIONAL RESOURCE USAGE

(71) Applicant: Uber Technologies, Inc., San Francisco, CA (US)

(72) Inventors: Valerie Nina Chadha, Brooklyn, NY (US); Ye Yuan, San Francisco, CA (US); Neil Stegall, Pittsburg, PA (US); Brent Justin Goldman, San Francisco, CA (US); Kane Sweeney, San Francisco, CA (US); Rei Chiang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/798,295

(22) Filed: Aug. 8, 2024

(65) Prior Publication Data

US 2024/0402710 A1 Dec. 5, 2024

Related U.S. Application Data

(63) Continuation of application No. 18/056,700, filed on Nov. 17, 2022, now Pat. No. 12,085,957, which is a (Continued)

(51) Int. Cl.
*G05D 1/00* (2024.01)
*G05D 1/227* (2024.01)

(Continued)

(52) U.S. Cl.
CPC ......... *G05D 1/0291* (2013.01); *G05D 1/0088* (2013.01); *G05D 1/227* (2024.01);

(Continued)

(58) Field of Classification Search
CPC .... G05D 1/0291; G05D 1/0088; G05D 1/227; G05D 1/69; G05D 1/0276; G05D 1/247;

(Continued)

(56) References Cited

U.S. PATENT DOCUMENTS

| | | | |
|---|---|---|---|
| 11,507,111 | B2 | 11/2022 | Chadha et al. |
| 2013/0204524 | A1 | 8/2013 | Fryer et al. |

(Continued)

OTHER PUBLICATIONS

"U.S. Appl. No. 16/446,021, Non Final Office Action mailed Feb. 2, 2022", 39 pgs.

(Continued)

*Primary Examiner* — Kyle J Kingsland
(74) *Attorney, Agent, or Firm* — Schwegman Lundberg & Woessner, P.A.

(57) ABSTRACT

Systems and methods for evaluating and deploying fleets of autonomous in operational domains are described. A computing system may obtain data indicative of one or more capabilities of at least one autonomous vehicle, data indicative of vehicle service dynamics in an operational domain over a period of time, and determining a plurality of resource performance parameters respectively for a plurality of autonomous vehicle fleets associated with potential deployment in the operational domain. Each autonomous vehicle fleet can be associated with a different number of autonomous vehicles The resource performance parameter for each autonomous vehicle fleet can be based at least in part on the one or more capabilities of the at least one autonomous vehicle and the vehicle service dynamics in the operational domain. The computing system can initiate an action associated with the operational domain based at least in part on the plurality of resource performance parameters.

20 Claims, 11 Drawing Sheets

Related U.S. Application Data continuation of application No. 16/446,021, filed on Jun. 19, 2019, now Pat. No. 11,507,111.

(60) Provisional application No. 62/753,482, filed on Oct. 31, 2018.

(51) Int. Cl.
*G05D 1/247* (2024.01)
*G05D 1/69* (2024.01)

(52) U.S. Cl.
CPC ............ *G05D 1/69* (2024.01); *G05D 1/0276* (2013.01); *G05D 1/247* (2024.01)

(58) Field of Classification Search
CPC .. G06Q 10/047; G06Q 10/0631; G06Q 50/40; G08G 1/202; G08G 1/00
See application file for complete search history.

(56) References Cited

U.S. PATENT DOCUMENTS

2013/0211660 A1 8/2013 Mitchell
2018/0202822 A1 7/2018 Delizio
2018/0211217 A1 7/2018 Berdinis et al.
2018/0231984 A1 8/2018 Alonso-Mora et al.
2018/0356821 A1 12/2018 Kentley-klay et al.
2018/0373268 A1 12/2018 Antunes Marques Esteves
2019/0026886 A1 1/2019 Ferguson et al.
2019/0035282 A1 1/2019 Ferguson et al.
2019/0179336 A1 6/2019 Colijn et al.
2019/0196503 A1 6/2019 Abari et al.
2019/0204097 A1 7/2019 Starns
2019/0236959 A1 8/2019 Belapurkar et al.
2020/0042019 A1 2/2020 Marczuk et al.
2020/0133306 A1 4/2020 Chadha et al.
2020/0256691 A1 8/2020 Marueli et al.
2023/0082138 A1 3/2023 Chadha et al.
2025/0229808 A1* 7/2025 Kentley-Klay .... G01C 21/3415

OTHER PUBLICATIONS

"U.S. Appl. No. 16/446,021, Notice of Allowance mailed Jul. 22, 2022", 9 pgs.
"U.S. Appl. No. 16/446,021, Response filed Jul. 5, 2022 to Non Final Office Action mailed Feb. 2, 2022", 11 pgs.
"U.S. Appl. No. 18/056,700, Advisory Action mailed Mar. 21, 2024", 3 pgs.
"U.S. Appl. No. 18/056,700, Corrected Notice of Allowability mailed May 21, 2024", 2 pgs.
"U.S. Appl. No. 18/056,700, Examiner Interview Summary mailed Apr. 9, 2024", 2 pgs.
"U.S. Appl. No. 18/056,700, Final Office Action mailed Jan. 17, 2024", 11 pgs.
"U.S. Appl. No. 18/056,700, Non Final Office Action mailed Aug. 2, 2023", 11 pgs.
"U.S. Appl. No. 18/056,700, Notice of Allowance mailed May 8, 2024", 9 pgs.
"U.S. Appl. No. 18/056,700, Response filed Mar. 15, 2024 to Final Office Action mailed Jan. 17, 2024", 10 pgs.
"U.S. Appl. No. 18/056,700, Response filed Nov. 2, 2023 to Non Final Office Action mailed Aug. 2, 2023", 10 pgs.

* cited by examiner

400

| Autonomous Vehicle Capabilities | |
|---|---|
| Temperature | |
| Precipitation Intensity | |
| Precipitation Type | |
| Sun Angle (Azimuth) | |
| Visibility | |
| Humidity | |
| Dewpoint | |
| Apparent Temperature | |
| Precipitation Probability | |
| Cloud cover | |
| Windspeed | |
| UV Index | |
| Speed | |
| Max Speed | |
| Road Type | |
| Minimum Lane Width | |
| Lane Type | |
| Lighting (Light Pollution) | |
| Road Grade/Vertical FOV | |
| Horizontal FOV | |
| U-Turns | |
| Max Cross Traffic Speed for Mergers | |
| All Way Stop Intersections | |
| Unprotected Right | |
| Unprotected Left | |
| Unprotected Straight | |
| Lane Changes | |
| Turn Through Bike Lanes | |

| VEHICLE SERVICE DYNAMICS | |
|---|---|
| Supply Hours | |
| Demand Hours | |
| Service Hours | |
| Service Miles | |
| En Route Hours | |
| Open Hours | |
| Efficiency | |
| Utilization | |

| RESOURCE OUTFLOWS | |
|---|---|
| Cost-Per-Hour (AV Fixed) | |
| Cost-Per-Mile (AV Variable) | |
| Cost-Per-Mile (Non-AV Variable) | |
| Price-Per-Mile (Non-AV Variable) | |

| FLEET SIZE | MARKET PENETRATION | FLEET EFFICIENCY | FLEET RESOURCE RETURN (vs. CPM) | FLEET RESOURCE RETURN (vs. PPM) | MARGINAL VEHICLE EFFICIENCY | MARGINAL VEHICLE RESOURCE RETURN (vs. CPM) | MARGINAL VEHICLE RESOURCE RETURN (vs. PPM) |
|---|---|---|---|---|---|---|---|
| Size_1 | | | | | | | |
| Size_2 | | | | | | | |
| Size_n | | | | | | | |

FIG. 10

AUTONOMOUS VEHICLE FLEET MANAGEMENT FOR IMPROVED COMPUTATIONAL RESOURCE USAGE

RELATED APPLICATION

This application is a continuation of U.S. application Ser. No. 18/056,700, filed Nov. 17, 2022, which is a continuation of U.S. application Ser. No. 16/446,021, filed Jun. 19, 2019, which claims priority to and the benefit of U.S. Provisional Patent Application No. 62/753,482, titled "Autonomous Vehicle Fleet Management for Improved Computational Resource Usage," and filed on Oct. 31, 2018, each of which is hereby incorporated by reference herein in its entirety.

FIELD

The present disclosure relates generally to improving the ability of remote computing devices to manage autonomous vehicle fleets.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for determining autonomous vehicle fleets. The method includes obtaining, by a computing system comprising one or more computing devices, data indicative of one or more capabilities of at least one autonomous vehicle. The method includes obtaining, by the computing system, data indicative of vehicle service dynamics in an operational domain over a period of time. The method includes determining, by the computing system, a plurality of resource performance parameters respectively for a plurality of autonomous vehicle fleets associated with potential deployment in the operational domain. Each of the autonomous vehicle fleets is associated with a different number of autonomous vehicles. The resource performance parameter for each autonomous vehicle fleet is based at least in part on the one or more capabilities of the at least one autonomous vehicle and the vehicle service dynamics in the operational domain. The method includes initiating, by the computing system, an action associated with the operational domain based at least in part on the plurality of resource performance parameters.

Another example aspect of the present disclosure is directed to a computing system. The computing system includes one or more processors, and one or more tangible, non-transitory, computer readable media that collectively store instructions that when executed by the one or more processors cause the computing system to perform operations. The operations include obtaining data indicative of one or more capabilities of at least one autonomous vehicle and obtaining data indicative of vehicle service dynamics in an operational domain over a period of time. The operations include determining a plurality of resource performance parameters respectively for a plurality of autonomous vehicle fleets associated with potential deployment in the operational domain. Each autonomous vehicle fleet is associated with a different number of autonomous vehicles and the resource performance parameter for each autonomous vehicle fleet is based at least in part on the one or more capabilities of the at least one autonomous vehicle and the vehicle service dynamics in the operational domain. The operations include initiating an action associated with the operational domain based at least in part on the plurality of resource performance parameters.

Yet another example aspect of the present disclosure is directed to one or more tangible, non-transitory, computer-readable media that collectively store instructions that, when executed by one or more processors, cause the one or more processors to perform operations. The operations include obtaining data indicative of one or more capabilities of at least one autonomous vehicle. The operations include obtaining data indicative of a resource outflow associated with operation of a first fleet of autonomous vehicles and a resource outflow associated with a second fleet of non-autonomous vehicles in the operational domain. The operations include determining a measure of utilization based at least in part on the one or more capabilities of the least one autonomous vehicle, a measure of the resource outflow associated with the first fleet of autonomous vehicles, and a measure of the resource outflow associated with the second fleet non-autonomous vehicles. The operations include determining a fleet size of the first fleet of autonomous vehicles for deployment in the operational domain based at least in part on the measure of utilization. The operations include initiating an action associated with the first fleet of autonomous vehicles in the operational domain based at least in part on the fleet size of the first fleet of autonomous vehicles determined for deployment in the operational domain.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

Other example aspects of the present disclosure are directed to systems, methods, vehicles, apparatuses, tangible, non-transitory computer-readable media, and memory devices for controlling autonomous vehicles and efficiently using the computational resources of the autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 depicts an example data structure including capabilities of an autonomous vehicle according to example embodiments of the present disclosure;

FIG. 5 depicts an example data structure including vehicle service dynamics associated with an operational domain according to example embodiments of the present disclosure;

FIG. 6 depicts an example data structure including resource outflows associated with an autonomous vehicle according to example embodiments of the present disclosure;

FIG. 10 depicts an example user interface for providing fleet and respective resource performance parameter information according to example embodiments of the present disclosure;

DETAILED DESCRIPTION

Figure 1:
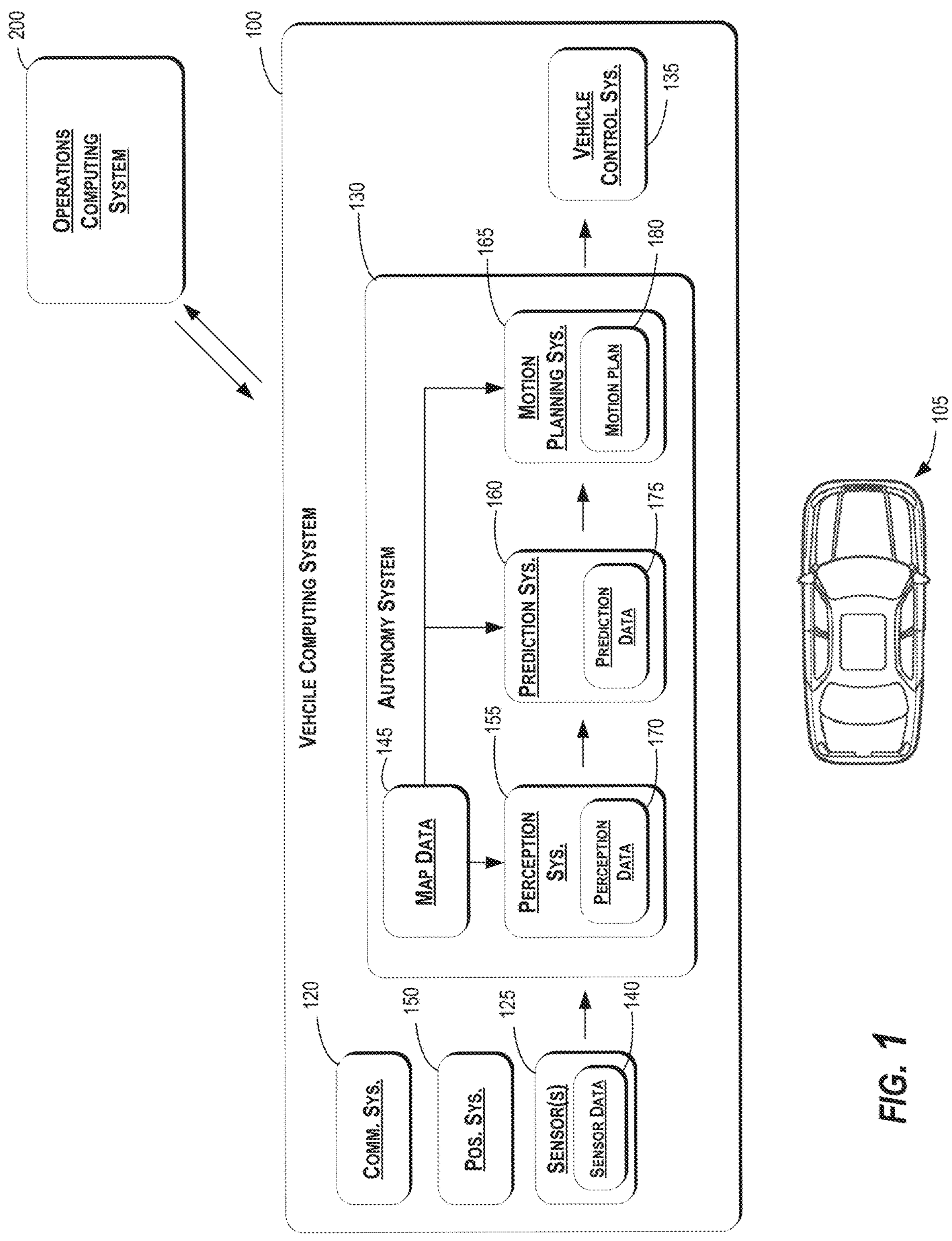
FIG. 1 depicts an example autonomous vehicle computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved techniques for evaluating the capabilities of fleets of autonomous vehicles relative to deployment within particular operational domains in which the fleets of autonomous vehicles may operate. Such techniques may reduce inessential use of computing resources of vehicles within a fleet, including data and processing resources. In this manner, the overall processing requirements of a network of computing devices formed by a fleet of autonomous vehicles and/or one or more service entity computing systems can be lowered. In example embodiments, a computing system can evaluate the deployment of fleets of autonomous vehicles based on data that indicates one or more capabilities of at least one autonomous vehicle and data that indicates vehicle service dynamics in an operational domain over a period of time. The computing system can initiate an action associated with a fleet of autonomous vehicles in the operational domain based on the resource performance parameters for the different fleets. For example, the computing system can provide resource efficiency and/or resource return information associated with at least one of the fleets. The computing system may indicate an optimal fleet size and respective efficiency and/or return information for the optimal fleet size. In this manner, a fleet deployment may be initiated based on resource performance parameters that indicate efficiency and/or return information associated with the analysis of various fleet sizes. As such, a network of computing devices formed by a selected fleet of autonomous vehicles can reduce data and processing requirements associated with fleets that are not optimized for a selected operational domain.

By way of example, an autonomous vehicle can be utilized to perform vehicle services (e.g., user transportation services, etc.). The vehicle services can be offered to users by a service entity (e.g., a company that offers and coordinates the provision of vehicle services). The service entity can select a fleet of autonomous vehicles, including a number of autonomous vehicles, for particular operational domains (e.g., geographic areas) in which the fleet of autonomous vehicles is to provide the vehicle services. In the event that a user requests a vehicle service, a computing system of the service entity can send a vehicle service assignment (e.g., a service request) to an autonomous vehicle that is online with the service entity. When it is not addressing a vehicle service assignment/performing a vehicle service, an autonomous vehicle can be in an idle state. However, even in the idle state, an autonomous vehicle can continue to acquire sensor data to remain cognizant of its environment (e.g., whether the vehicle is parked, moving, etc.). This can cause the autonomous vehicle to use processing, data storage, and power resources inefficiently, such as by consuming resources while the vehicle is not performing a vehicle service.

The systems and methods of the present disclosure help to reduce such computational waste by providing an improved approach to selecting and/or deploying fleets of autonomous vehicles within particular operational domains. The computing system can initiate a variety of actions based on the resource performance parameter(s) determined for a plurality of fleets of autonomous vehicles. For example, the computing system can rank autonomous vehicle fleets, provide resource performance information such as efficiency and/or return information associated with autonomous vehicle fleets, determine an appropriate fleet to deploy for a particular operational domain, prioritize vehicle technology development for fleets of autonomous vehicles, etc. In this way, the systems and methods described herein provide a more computationally efficient approach for evaluating and selecting fleets of autonomous vehicles that will lead to higher autonomous vehicle usage, thereby reducing potential computational waste.

An autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. For example, a service entity can offer vehicle service(s) to users via a software application (e.g., on a user computing device, etc.), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An autonomous vehicle can operate within an operational domain, for example, to provide vehicle services. An operational domain can be an environment in which an autonomous vehicle has, is, or may potentially operate. For example, an operational domain can include a geographic area. The geographic area can be a market in which vehicles associated with the service entity (e.g., non-autonomous vehicles, autonomous vehicles, etc.) currently operate or a potential market in which vehicles associated with the service entity may potentially operate in the future. An operational domain may include a city, town, other municipality, etc. In some implementations, an operational domain can include one or more sub-regions. For example, the operational domain can include a city with one or more neighborhoods. Moreover, the operational domain can include travel ways (e.g., roads, streets, pathways, intersections, etc.). The travel ways can include lanes and/or other designated portions for a vehicle to travel on the travel ways.

A computing system (e.g., associated with a service entity) can evaluate various fleets of autonomous vehicles to determine which fleet would be most appropriate for operation in a particular operational domain. The computing system can be configured to identify one or more autonomous vehicle fleets of interest. The identified autonomous vehicle fleets can each include a different number of autonomous vehicles. A user may identify a range of autonomous vehicle fleet sizes for identification and analysis by the computing system. Additionally, and/or alternatively, at least one of the identified autonomous vehicle fleets can include one or more capabilities that are different than a corresponding capability of an autonomous vehicle in another fleet. In this manner, the computing system can analyze different fleets of autonomous vehicles according to their size and/or capabilities.

A computing system can evaluate fleets of autonomous vehicles for operations in an operational domain based on the capabilities of an autonomous vehicle and vehicle service dynamics within the operational domain. A computing system can obtain a level of addressability for an operational domain that is based on a capability of an autonomous vehicle. For example, the level of addressability for an operational domain may indicate a number of travel routes that are traversable by an autonomous vehicle in the operational domain.

A computing system can obtain or determine data indicative of vehicle service dynamics, including data associated with usage of one or more vehicles within the operational domain for a vehicle service. The usage data may be associated with one or more vehicle types, such as autonomous or non-autonomous vehicles, within the operational domain. Usage data may include data indicative of at least one of supply hours, demand hours, service hours, service miles, efficiency, or utilization. Based on a level of addressability for an operational domain indicating a number of travel routes that are traversable by an autonomous vehicle in the operational domain, vehicle service dynamics data can be filtered to determine a number of vehicle services that are serviceable by an autonomous vehicle in an operational domain. In some examples, vehicle service dynamics data can include a growth factor that allows the system to scale historical service requests higher or lower according to expected growth or declines. A growth factor can be applied for every hour or in other increments such as days, years, etc. Usage data may include historical usage data and/or future usage data. For example, one or more models and/or forecasts may be used to predict future supply and demand associated with a vehicle service.

In accordance with some aspects of the disclosed technology, data indicative of one or more measures of resource outflow can be determined. A measure of resource outflow can be used in addition to the capabilities of an autonomous vehicle and the vehicle service dynamics associated with an operational domain to determine a measure of predicted efficiency and/or resource return for a plurality of candidate autonomous vehicle fleets for potential deployment in an operational domain. A measure of resource outflow can be a measure of operation or deployment associated with at least one autonomous vehicle. In some examples, a measure of operation or deployment can include a cost measure. The cost measure may include a fixed and/or variable cost. For instance, a fixed hourly (e.g., time-based) capital cost that is incurred per unit of time, independent of whether a vehicle is used or not, can be used. Additionally, a variable per-mile cost can be used. In some examples, measures of resource outflow may be obtained for different vehicle types. For example, cost measures associated with autonomous vehicle services and cost measures associated with non-autonomous vehicle services can be obtained. Examples of cost measures can include autonomous vehicle service cost-per-mile and/or price-per-mile. Additionally, and/or alternatively, non-autonomous vehicle service cost-per-mile and/or price-per-mile can be obtained. In some examples, data indicative of measures of resource outflow can include a number of hours or other unit of time during which a vehicle operates.

In accordance with example embodiments, a computing system can determine data indicative of a plurality of resource performance parameters respectively for a plurality of candidate autonomous vehicle fleets for potential deployment in an operational domain. The resource performance parameter(s) for each candidate autonomous vehicle fleet can include at least a resource efficiency and/or resource return based at least in part on the capabilities of an autonomous vehicle, the vehicle service dynamics associated with an operational domain, and/or the resource outflow associated with an autonomous vehicle. In example embodiments, the computing system can analyze a plurality of autonomous vehicle fleets and determine one or more optimal autonomous vehicle fleets, such as one or more optimal autonomous vehicle fleet sizes.

Based on the capabilities of an autonomous vehicle, the vehicle service dynamics associated with an operational domain, and/or the resource outflow information, a measure of predicted efficiency and/or resource return can be determined for the plurality of autonomous vehicle fleets. By way of example, the computing system can output a fleet size and a total efficiency and/or resource return expected for a particular fleet size. The fleet size and total efficiency and/or resource return can be provided for various profiles. For example, different input data reflecting different vehicle capabilities, different vehicle service dynamics, and/or different resource outflows can be used to generate outputs for multiple profiles. In some examples, a measure of resource return can include a measure of profitability associated with a fleet of autonomous vehicles.

For a potential fleet having a particular number of vehicles, the computing system can determine a fleet efficiency and/or a marginal vehicle efficiency in example embodiments. The fleet-level efficiency can indicate a percentage or amount of time that a fleet of vehicles spends on service assignments relative to the fleet's overall in-service time. The fleet efficiency can be a time efficiency of an overall fleet in example embodiments. The marginal vehicle efficiency can indicate a percentage or amount of time that an individual vehicle spends on service assignments relative to its overall service time. The marginal vehicle efficiency can be a time efficiency of an individual vehicle in example embodiments. In some examples, time efficiencies can be converted into mileage efficiencies.

Additionally and/or alternatively, a measure of predicted resource return can be determined for each of a plurality of autonomous vehicle fleets. For a potential fleet having a particular number of vehicles, the computing system can determine a market penetration (e.g., a total share of the market), a fleet-level resource return measure, and/or a marginal vehicle resource return measure. The market penetration can indicate a total share of the market the fleet is expected to capture. The fleet-level return measure can indicate a profitability expected by deploying a fleet of a particular size in an operational domain. The marginal vehicle resource return measure can indicate a profitability expected by deploying an individual vehicle of the fleet within the operational domain.

In some examples, a measure of marginal cost of using vehicles of a first vehicle type (e.g., autonomous vehicles) versus vehicles of a second vehicle type (e.g., non-autonomous vehicles operated by third-parties) can be determined. An average cost-per-mile for each vehicle type can be determined. In some examples, an average cost-per mile for a mixed service including a fleet of vehicles of a first vehicle type at a particular fleet size and a fleet of vehicles including a second vehicle type can be determined. A level can be determined where the cost of providing marginal hours of supply using vehicles of the first type is equal to the cost of providing marginal hours of supply using vehicles of the second type. This level may be referred to as a breakeven utilization of the first vehicle type. A measure of breakeven utilization can be based at least in part on a number of autonomous vehicles having a total resource outflow per unit that is equal to a total resource outflow per unit for a fleet of non-autonomous vehicles. In some instances, a total displaced market size of vehicles of a second type by vehicles of a first type can be determined given an average per-mile cost.

In some implementations, the computing system can determine a prioritization of at least one capability based at least in part on the plurality of resource performance parameters and output data indicative of a prioritization of the at least one capability. For example, in the event that it is determined that adding the ability to perform an unprotected left turn to an autonomous vehicle would lead to the higher resource performance parameter, the computing system can provide data (e.g., to another computing system, displayed on a display screen, etc.) indicating that the development of the unprotected left turn capability should be prioritized during vehicle technology development.

According to some aspects, a computing system can obtain data indicative of one or more capabilities of at least one autonomous vehicle, data indicative of a resource outflow associated with operation of a first fleet of autonomous vehicles in an operational domain, and data indicative of a resource outflow associated with a second fleet of non-autonomous vehicles in the operational domain. The computing system can determine a measure of utilization based at least in part on the one or more capabilities of the least one autonomous vehicle, a measure of the resource outflow associated with the first fleet of autonomous vehicles, and a measure of the resource outflow associated with the second fleet of autonomous vehicles. The computing system can determine a fleet size of the first fleet of autonomous vehicles for deployment in the operational domain based at least in part on the measure of utilization. In some examples, the computing system can initiate an action associated with the first fleet of autonomous vehicles in the operational domain based at least in part on the fleet size of the first fleet of autonomous vehicles determined for deployment in the operational domain.

In some examples, the computing system can determine a convergence associated with a measure of resource outflow associated with the first fleet of autonomous vehicles and a measure of resource outflow associated with the second fleet of autonomous vehicles. The convergence can be an indication of a point where a number of autonomous vehicles having a total resource outflow per unit is equal to a total resource outflow per unit for a fleet of non-autonomous vehicles. Determining a measure of utilization can include determining a measure of utilization based at least in part on the convergence.

A computing system can obtain or determine a level of addressability for an operational domain given a capability of the autonomous vehicle. For instance, a computing system can obtain data indicative of various capabilities of the autonomous vehicle. This can include, for example, capabilities that are currently being and/or planned to be developed (e.g., the ability to make an unprotected left turn, the ability to operate in heavy snowfall, etc.). The computing system can also obtain data indicative of the potential travel routes within the operational domain (e.g., various travel routes for transporting users). The computing system can determine how many of these potential routes could be traversed by an autonomous vehicle given a capability. For example, the computing system can determine how many of these routes could be traversed by an autonomous vehicle if the autonomous vehicle was capable of performing an unprotected left turn. The computing system can determine a level of addressability for the operational domain based on the number of traversable routes (e.g., indicating the accessibility of that operational domain to the autonomous vehicle). The plurality of resource performance parameters determined for a plurality of autonomous vehicle fleets can be based at least in part on the level of addressability of the operational domain. The data indicative of an addressability of the operational domain can be used with vehicle service dynamics data to determine vehicle service requests that are serviceable by an autonomous vehicle in the operational domain.

A computing system can obtain or determine vehicle service dynamics data that includes usage information associated with one or more vehicles providing a vehicle service in an operational domain. The usage data may be indicative of supply and/or demand information associated with one or more vehicles. The usage data may be based on historical usage data in some examples. Additionally and/or alternatively, the usage data may include future usage data. For example, one or more models and/or forecasts may be used to predict future supply and demand associated with a vehicle service. Data indicative of supply associated with one or more vehicles may include data indicative of a number of vehicles that provide one or vehicle services within an operational domain. For example, data indicative of a number of vehicles that provide a passenger vehicle service within the operational domain can be obtained. In some examples, the data may be indicative of different vehicle types associated with a vehicle service. For examples, usage data associated with autonomous vehicles as well as usage data associated with non-autonomous vehicles that provide a passenger vehicle service can be obtained. The supply data may include a number of supply hours associated with a vehicle type. In some examples, the supply hours or other data is indicative of a supply by hours of the day. In this manner, the amount of supply available to cover demand in a given hour can be considered, which may be a more accurate representation than overall supply hours in a day since coverage at one time may not translate into coverage at another.

Data indicative of demand associated with one or more vehicles may be used alone or in combination with supply information. Data indicative of demand may include data indicative of a number of vehicles or vehicle service requests associated with users of a vehicle service type within an operational domain. For example, data indicative of a number of service requests and/or service assignments in association with a passenger vehicle service within the operational domain can be obtained. The supply data may include a number of supply hours associated with a vehicle type. The demand data may include a distribution of hourly supply-hour demand associated with a vehicle type. In some examples, the demand data is indicative of a demand by hours of the day.

Supply and demand information may be associated with one or more vehicle types and/or one or more vehicle service types, such as a passenger vehicle service type, a package service delivery type, etc. The supply and demand data may include a number of supply and demand hours associated with a vehicle type. In some examples, the supply and demand hours or other data is indicative of a supply and demand by hours of the day. The supply and demand hours may be indicative of a total number of supply and demand hours associated with a vehicle service type or may be more granular. For example, the supply and demand hours may be indicative of supply and demand hours associated with a particular provider or service entity of a vehicle service type.

Utilization of a vehicle may be defined as an amount or percentage of time that a vehicle spends in service. For example, the utilization may be defined as the fraction of hours in a year that a vehicle spends in service. Efficiency of a vehicle can be defined as the amount or percentage of time the vehicle spends on service assignments relative to its overall service time. For example, efficiency can be defined as the fraction of in-service time that is spent on service assignments.

In some examples, a breakeven utilization of a fleet of vehicles of a first type relative to a second fleet of vehicles of a second type can be determined. For instance, the first fleet may be a fleet of autonomous vehicles and the second fleet may be a fleet of non-autonomous or human-driven vehicles. The resource outflow, such as the cost-per-mile, associated with a vehicle in each fleet may be different. For example, the cost-per-mile for a vehicle in the second fleet may be greater than the cost-per-mile for a vehicle in the first fleet. A breakeven utilization of the first fleet of vehicles can be determined as the point where the total resource outflow (e.g., cost-per-mile) associated with a vehicle of the first fleet is equal to the total resource outflow associated with a vehicle of the second fleet. A breakeven utilization can be calculated by determining a first product of an hourly capital cost associated with a vehicle of the first fleet and an average number of vehicle service hours per service mile. A second product of an efficiency of a first vehicle and the difference between the cost-per-mile for a vehicle of the second fleet and a vehicle of the first fleet can be determined. The breakeven utilization can be calculated as the quotient of the first product and the second product. The breakeven utilization can be a percentage of each hour that a vehicle of the first fleet needs to be used for a vehicle service.

A distribution of the number of service hours demanded in each hour for a set of requests serviceable by vehicles in the first fleet can be determined. The utilization can be plotted on the vertical axis and a number of hourly demand hours can be plotted on the horizontal axis. The breakeven utilization point can be identified on the vertical axis and a corresponding number of hourly demand hours (capacity hours) can be determined from the corresponding point along the horizontal axis. The capacity hours indicate that for a fleet sized to provide that many hourly demand hours, the marginal vehicle of the fleet (number of vehicles) is a breakeven cost relative to vehicles of the second fleet. Assuming no downtime (e.g., due to maintenance or charging), the capacity hours can correspond to the optimal number of vehicles in the fleet. Hours of the day where the service demand is less than the capacity can be serviced by the first fleet of vehicles alone. Hours of the day where the service demand is greater than the capacity can be serviced by a mix of the first fleet and the second fleet.

A total number of service hours provided by vehicles of the first fleet and a total number of service hours provided by vehicles of the second fleet can be determined based on the capacity hours and the distribution of the number of service hours demanded in each hour. An average cost-per-mile for the combined fleets can be determined based on taking the blended cost-per-mile for the first fleet and the second fleet. The total hourly cost of service by the second fleet can be computed based on the variable cost associated with the second fleet, the number of service miles per hour that can be serviced by the first fleet, the total number of service hours per hour for the first fleet, and/or the number of service hours per mile. The total hourly cost of service by the first fleet can be computed based on the variable cost associated with the first fleet, the total number of service hours per hour for the first fleet, the number of service hours per mile, the hourly (time-based) capital cost for the first fleet, and/or the breakeven utilization. The average cost-per-mile for a service utilizing the first fleet and the second fleet can be determined based on the total hourly costs of both fleets and/or total service miles per hour.

In some examples, a market displacement can be used to determine a breakeven utilization and/or optimal number of vehicles for a fleet. For example, a price associated with a vehicle service provided by the first fleet can be considered in relation to how many other types of transportation service requests and/or assignments it may displace. A number of additional service requests that the first fleet of vehicles may be expected to capture from these other services can be determined. In some examples, an average cost can be recalculated based on the additional service requests captured. In other examples, the average cost can be assumed to remain the same based on the assumption that the mix of service requests and their temporal distribution does not change with increased demand. The optimal number of vehicles as a proportion of demand may stay constant resulting in a constant average cost. Optimal average cost can be determined based on the proportion of service requests serviceable by the first fleet, the distribution of demand hours per hour (e.g., the "peakedness" of demand) and the variable mileage and time-based vehicle costs. An optimal average cost can be mapped against alternative service costs to estimate market expansion. Once the market size is determined, it can be mapped back to the cost model to determine an optimal number of AVs.

A simple uniform distribution may be used to model demand. For a uniform demand, an optimal fleet size can be determined based on the mean demand (e.g., mean number of demand hours per hour) and the breakeven utilization.

The systems and methods described herein provide a number of technical effects and benefits. More particularly, the systems and methods of the present disclosure provide improved techniques for evaluating fleets of autonomous vehicles relative to an operational domain. For instance, as described herein, a computing system can determine a fleet of autonomous vehicles, including a fleet size that is the most appropriate for an operational domain. Such determinations can be based on the capabilities of an autonomous vehicle, vehicle service dynamics in an operational domain, and/or resource outflow information associated with an autonomous vehicle in the operational domain. The resource performance parameters can indicate a level of resource efficiency and/or resource return in an operational domain. By improving the ability to identify an appropriate fleet for a particular operational domain, the systems and methods can reduce computer processing requirements by reducing idle time associated with computing systems of the autonomous vehicles and/or the computing systems of service entities. As described herein, idle time can lead to wasteful usage of onboard computational resources and more frequent maintenance (e.g., for download downlink, charging, etc.). By optimizing fleets of autonomous vehicles to operational domains, more productive utilization of the autonomous vehicle and its computational resources can be achieved, while decreasing inessential data usage.

Moreover, the systems and methods of the present disclosure provide improved techniques for prioritizing the development of vehicle capabilities. By prioritizing the development of certain capabilities over others, a more appropriate fleet of autonomous vehicles can be deployed for more useful operation within a particular operational domain. As such, the computational resources utilized by a network of autonomous vehicles and service entities can be reduced. By identifying more appropriate fleets of autonomous vehicles and vehicle capabilities, the systems and methods of the present disclosure allow for more efficient utilization of an autonomous vehicle and its onboard computing system.

Example aspects of the present disclosure can provide an improvement to vehicle computing technology, such as autonomous vehicle computing technology. For instance, the systems and methods of the present disclosure provide an improved approach to evaluate fleets of autonomous vehicles so that the computational resources of the fleet of autonomous vehicles are more productively utilized. For example, a computing system (e.g., a computing system that is remote from the autonomous vehicle) can obtain data indicative of one or more capabilities of an autonomous vehicle and data indicative of vehicle service dynamics in an operational domain over time. The computing system can determine a plurality of resource performance parameters respectively for a plurality of autonomous vehicle fleets associated with potential deployment in the operational domain. Each autonomous vehicle fleet can be associated with a different number of autonomous vehicles. The resource performance parameter for each autonomous vehicle fleet can be based at least in part on the one or more capabilities of the at least one autonomous vehicle and the vehicle service dynamics in the operational domain.

The computing system can initiate an action associated with the operational domain based at least in part on the plurality of resource performance parameters. The action can include, for example, autonomous vehicle fleet (e.g., fleet size) selection, ranking, recommending, etc. as well as technology development prioritization. This process can be iterated for a plurality of fleets, a plurality of capabilities, a plurality of vehicle service dynamics, and/or a plurality of operational domains. Accordingly, the computing system can determine which autonomous vehicle fleets would lead to higher usage rates of autonomous vehicles (e.g., based on the vehicle capabilities and service dynamics) and lower potential vehicle idle time. Moreover, the computing system can determine which capabilities may help increase vehicle productivity for a fleet (e.g., based on the vehicle capabilities and service dynamics) and, thus, should be prioritized for technology development. Accordingly, the computing system can identify fleets of autonomous vehicles and vehicle capabilities that would lead the autonomous vehicle(s) to more likely be utilized in a productive manner to benefit the autonomous vehicle (e.g., by increasing the likelihood that the autonomous vehicle will receive vehicle service assignments and avoiding idle data usage). This allows for a more efficient use of the processing, memory, and power resources of the vehicle's computing system, and reduces the need for autonomous vehicles to go offline to preserve such resources. Ultimately, the computing system can decrease wasteful usage of the computational resources of an idle autonomous vehicle by strategically analyzing and determining which fleets of autonomous vehicles will lead to efficient autonomous vehicles, as described herein.

Various means can be configured to perform the methods and processes described herein. For example, a computing system can include data obtaining unit(s), autonomous vehicle (AV) capability determination unit(s), fleet size and resource determination unit(s), action initiation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain data indicative of one or more capabilities of at least one autonomous vehicle and/or data indicative of vehicle service dynamics in an operational domain over a period of time (e.g., via an accessible memory). In some implementations, the means can be configured to determine a plurality of resource performance parameters respectively for a plurality of autonomous vehicle fleets associated with potential deployment in the operational domain. Each autonomous vehicle fleet can be associated with a different number of autonomous vehicles. The resource performance parameter for each autonomous vehicle fleet can be based at least in part on the one or more capabilities of the at least one autonomous vehicle and the vehicle service dynamics in the operational domain. In some implementations, the means can be configured to obtain obtaining data indicative of a resource outflow associated with the at least one autonomous vehicle. A data obtaining unit is one example of a means for obtaining such data as described herein.

The means can be configured to determine a plurality of resource performance parameters respectively for a plurality of autonomous vehicle fleets associated with potential deployment in the operational domain, a measure of utilization based at least in part on the one or more capabilities of the least one autonomous vehicle, and/or a fleet size of the first fleet of autonomous vehicles for deployment in the operational domain. For example, the means can be configured to determine the resource performance parameter for each autonomous vehicle fleet based at least in part on the one or more capabilities of the at least one autonomous vehicle and the vehicle service dynamics in the operational domain. The means can be configured to determine a measure of utilization based at least in part on the one or more capabilities of the least one autonomous vehicle, a measure of the resource outflow associated with the first fleet of autonomous vehicles, and a measure of the resource outflow associated with the second fleet of autonomous vehicles. The means can be configured to determine a fleet size of the first fleet of autonomous vehicles for deployment in the operational domain based at least in part on the measure of utilization.

The means can be configured to initiate an action associated with the operational domain based at least in part on the plurality of resource performance parameters. For example, the means can be configured to output data indicative of the plurality of resource parameters (e.g., to a memory, to another computing system, for display on a display device, etc.). The plurality of resource parameters can include measures of resource returns, measures of resource efficiency (e.g., time efficiency, mileage efficiency), measures of breakeven utilization, optimal fleet sizes, etc. Additionally, or alternatively, the means can be configured to a prioritization of one or more capabilities and output data indicative of such prioritization (e.g., to a memory, to another computing system, for display on a display device, etc.). Additionally, or alternatively, the means can be configured to generate a ranking of fleets of autonomous vehicles and output data indicative of such a ranking (e.g., to a memory, to another computing system, for display on a display device, etc.). An action initiation unit is a one example of a means for initiating an action based at least in part on a plurality of resource performance parameters as described herein.

With reference now to the drawings, example embodiments of the present disclosure will be discussed in further detail. FIG. 1 illustrates an example vehicle computing system 100 according to example embodiments of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The autonomous vehicle 105 can also include other sensors configured to acquire data associated with the autonomous vehicle 105. For example, the autonomous vehicle 105 can include inertial measurement unit(s), wheel odometry devices, and/or other sensors.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the autonomous vehicle 105 according to the motion plan.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160 (and/or the motion planning system 165).

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the autonomous vehicle 105 (e.g., multiple times per second). Each new motion plan can describe a motion of the autonomous vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

The autonomous vehicle 105 can be associated with a variety of different parties. The vehicle computing system 100 of the autonomous vehicle 105 can be configured to communicate with a plurality of different computing systems that are remote from the autonomous vehicle 105. In some implementations, the autonomous vehicle 105 can be associated with a vehicle provider. The vehicle provider can include, for example, an owner, a manufacturer, a vendor, a manager, a coordinator, a handler, etc. of the autonomous vehicle 105. The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system 100 of the autonomous vehicle 105. The vehicle provider computing system can include a server system (e.g., of an entity), a user device (e.g., of an individual owner), and/or other types of computing systems.

The autonomous vehicle 105 can be configured to perform vehicle services for a plurality of different service entities. An autonomous vehicle 105 can perform a vehicle service by, for example and as further described herein, travelling (e.g., traveling autonomously) to a location associated with a requested vehicle service, allowing user(s) and/or item(s) to board or otherwise enter the autonomous vehicle 105, transporting the user(s) and/or item(s), allowing the user(s) and/or item(s) to deboard or otherwise exit the autonomous vehicle 105, etc. In this way, the autonomous vehicle 105 can provide the vehicle service(s) for a service entity to a user.

A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

An operations computing system can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system, etc.), a user device, etc. The operations computing system can be, for example, a data center for a service entity. The operations computing system can be distributed across one or more location(s) and include one or more sub-systems. The computing device(s) of an operations computing system can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system (e.g., the one or more processors, etc.) to perform operations and functions, such obtaining data indicative autonomous vehicle capabilities, obtaining data indicative of vehicle service dynamics in an operational domain, determining a plurality of resource performance parameters respectively for a plurality of autonomous vehicle fleets associated with potential deployment in the operational domain, and initiating an action associated with the operational domain based at least in part on the plurality of resource performance parameters, etc. as further described herein.

Example embodiments of the present disclosure describe operations and functions performed by an operations computing system, a vehicle provider computing system, and/or a vehicle computing system for illustrative purposes. One or more of the operations and functions described as being performed by one system can be performed by another. For example, the operations and functions of an operations computing system of a service entity can be performed by another computing system (e.g., the vehicle provider computing system 250, the vehicle computing system 100, etc.), and vice versa, and/or any combination thereof.

Figure 2:
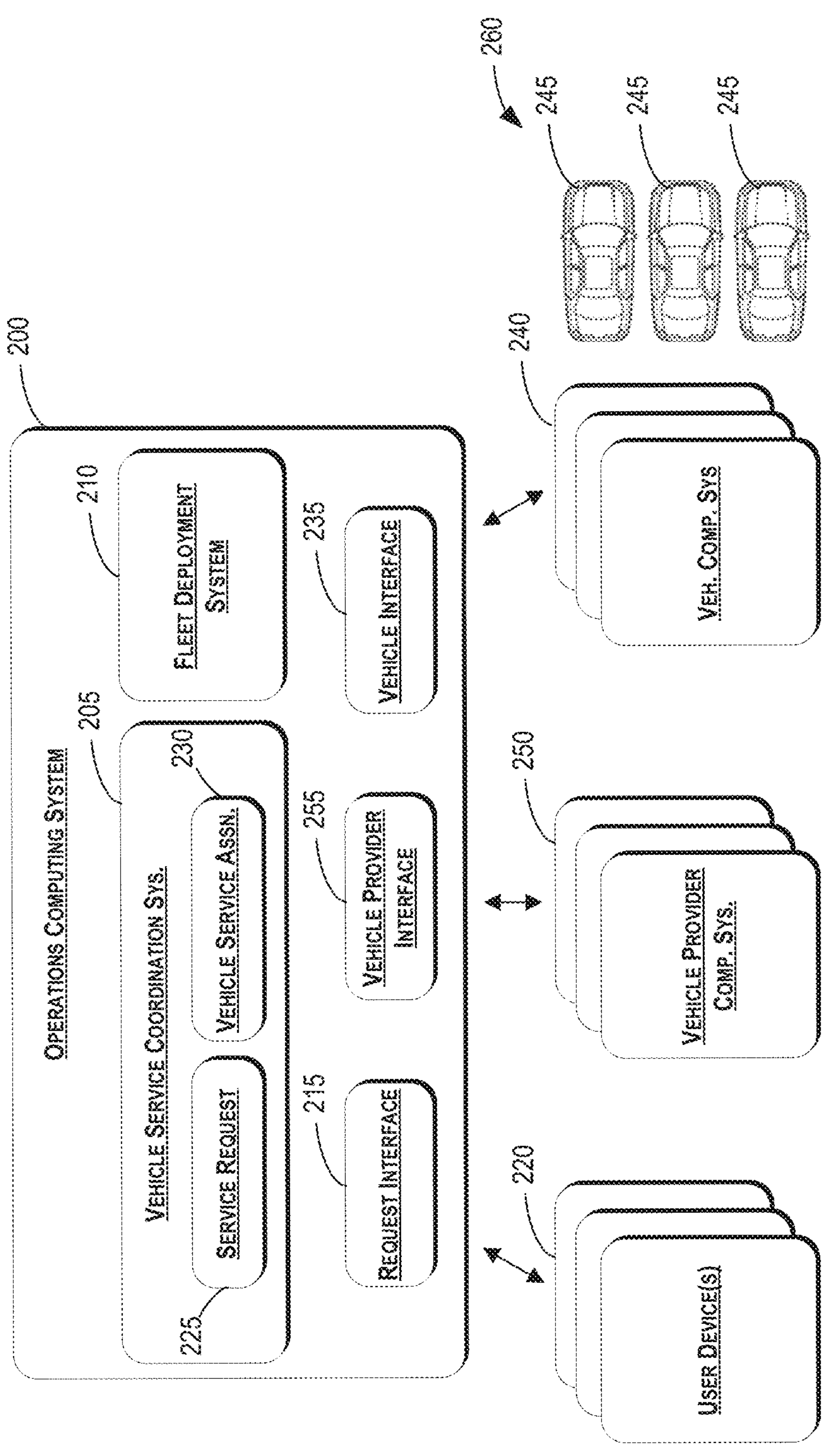
FIG. 2 depicts an example operations computing system of a service entity according to example embodiments of the present disclosure.

An operations computing system can be configured to select and/or deploy fleets of autonomous vehicle in an operation domain to reduce vehicle downtime and idle data usage. FIG. 2 depicts an example operations computing system 200 of a service entity according to example embodiments of the present disclosure. The operations computing system 200 can be associated with a service entity and/or a vehicle provider. The operations computing system 200 can include a vehicle service coordination system 205, a fleet deployment system 210, and/or other systems.

The vehicle service coordination system 205 can be configured to coordinate the provision of one or more vehicle services to one or more users. For instance, the operations computing system 300 can include a request interface 215. The request interface 215 can allow the operations computing system 200 to communicate with one or a plurality of user devices 220 (e.g., mobile phones, desktops, laptops, tablets, game systems, etc.). The request interface 215 can allow the operations computing system 300 and the user device(s) 220 to communicate data to and/or from one another. For example, the user device(s) 220 can communicate (e.g., via the request interface 215) data indicative of a service request 225 for a vehicle service to an operations computing system 300 associated with a service entity.

The vehicle service coordination system 205 can be configured to generate a vehicle service assignment 230. A vehicle service assignment 230 can be indicative of a vehicle service (e.g., requested by a user via the user device(s) 220) to be performed by a vehicle (e.g., an autonomous vehicle). A vehicle service assignment 230 can include a variety of information associated with the vehicle service, the requesting user, the user device, the service entity, etc.

The operations computing system 200 (e.g., the vehicle service coordination system 205) can identity one or more autonomous vehicles that are available for a vehicle service 230 330. The vehicle service coordination system 205 can identify autonomous vehicle(s) that are online with the service entity associated with the operations computing system 300. The vehicle service coordination system 205 can select an autonomous vehicle for the vehicle service assignment based at least in part on the data indicated in the vehicle service assignment.

The operations computing system 200 can utilize a vehicle interface 235 to communicate data indicative of a vehicle service assignment 230 to one or more vehicle computing systems 240 of one or more autonomous vehicles 245. The vehicle computing system(s) 240 can include the vehicle computing system 100 and/or be configured in similar manner (e.g., as shown in FIG. 1) and the autonomous vehicle(s) 245 can include the autonomous vehicle 105. The vehicle interface 235 can allow the operations computing system 300 and one or a plurality of vehicle computing systems 240 (e.g., of one or a plurality of autonomous vehicles 245) to communicate data to and/or from one another. For example, the operations computing system 200 can communicate, via the vehicle interface 235, data indicative of a vehicle service assignment 230 to one or more vehicle computing system(s) 240 of the autonomous vehicles 245 that the operations computing system 300 selects for the vehicle service assignment 230. Additionally, or alternatively, the vehicle computing system(s) 240 can communicate data associated with the autonomous vehicle(s) 345 to the operations computing system 200. In this way, the operations computing system 300 can coordinate the performance of vehicle service(s) for user(s) by the autonomous vehicle(s) 245 as well as monitor the autonomous vehicle(s) 245.

In some implementations, the operations computing system 200 can select a non-autonomous vehicle (e.g., human driven vehicle) for a vehicle service assignment 230. The vehicle service assignment 230 can be indicative of a request that the operator provide the requested vehicle service to a user associated with the vehicle service assignment 230.

The operations computing system 200 can communicate with one or more vehicle provider computing systems 250 (associated with one or more vehicle providers) via a vehicle provider interface 255. The vehicle provider computing system(s) 250 can include and/or be configured in a similar manner to the vehicle provider computing system 250 (shown in FIG. 2). The vehicle provider computing system(s) 250 can be associated with vehicle providers that are associated with a fleet 260 of autonomous vehicle(s) 245. The vehicle provider interface 255 can allow the operations computing system 300 and one or a plurality of vehicle provider computing systems 250 (e.g., of one or more vehicle providers, etc.) to communicate data to and/or from one another. For example, the operations computing system 200 can communicate, via the vehicle provider interface 255, data indicative of a vehicle service assignment 230, and/or other data as described herein, to one or more vehicle provider computing system(s) 250. The vehicle provider computing system(s) 250 can then communicate such data to the vehicle computing system(s) 240. Additionally, or alternatively, the vehicle provider computing system(s) 250 can communicate data associated with one or more autonomous vehicles 245 (and/or other data) to the operations computing system 200.

A service entity may have varying levels of control over the vehicle(s) that perform its vehicle services. In some implementations, a vehicle can be included in the service entity's dedicated supply of vehicles. The dedicated supply can include vehicles that are owned, leased, or otherwise exclusively available to the service entity (e.g., for the provision of its vehicle service(s), other tasks, etc.) for at least some period of time. This can include, for example, an autonomous vehicle 245 that is associated with a vehicle provider, but that is online only with that service entity (e.g., available to accept vehicle service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity. For example, an autonomous vehicle 245 that is currently online with two different service entities so that the autonomous vehicle 245 may accept vehicle service assignment(s) 230 from either service entity (e.g., from the operations computing systems associated therewith, etc.) may be considered to be part of a non-dedicated supply of autonomous vehicles. In some implementations, whether a vehicle is considered to be part of the dedicated supply or the non-dedicated supply can be based, for example, on an agreement between the service entity and a vehicle provider associated with the autonomous vehicle 245.

An autonomous vehicle 245 can enter into an idle state while it is online with the service entity. An idle state can be a state in which the autonomous vehicle is online with a service entity and is not addressing a vehicle service assignment 230 and/or otherwise performing a vehicle service. This can include the time between vehicle service assignments 230. By way of example, an online autonomous vehicle can enter into an idle state after the autonomous vehicle 245 finishes performing a vehicle service for a first vehicle service assignment (e.g., drops off a user at a destination location in accordance with a service request). The idle state can, thus, indicate the time at which the autonomous vehicle is available to perform a vehicle service but is not currently performing and/or assigned to one (e.g., traveling to an origin location, transporting an item/user, traveling to a destination location, etc.).

The operations computing system 200 can determine that an autonomous vehicle 245 is in an idle state. For instance, an autonomous vehicle can be online with a service entity. In some implementations, an autonomous vehicle 245 can communicate data to the operations computing system 200 indicating that the autonomous vehicle 245 has entered into an idle state and/or that the autonomous vehicle 245 has completed a vehicle service assignment 230. This data can be indicative of a vehicle's: a vehicle service state (e.g., idle, addressing a vehicle service assignment, etc.), online/offline status, the vehicle's current and/or future planned location, whether the vehicle is in the service entity's dedicated or non-dedicated supply, and/or other information. In some implementations, a vehicle provider computing system 250 (e.g., that is remote from the autonomous vehicle 245) can communicate such data to the operations computing system 200. In some implementations, the operations computing system 200 can monitor an autonomous vehicle 245 to determine that the autonomous vehicle 245 has entered into an idle state. For instance, the operations computing system 200 can obtain (e.g., from the autonomous vehicle 245, from the vehicle provider computing system 250, etc.) data indicating that the autonomous vehicle 245 has completed a first vehicle service assignment and can determine that the autonomous vehicle 245 is not assigned to a second vehicle service assignment.

The operations computing system 200 can aim to ensure that a fleet of autonomous vehicles 245 is productively utilizing its collective computational resources to avoid autonomous vehicles remaining in an idle state. To minimize non-essential use of computing resources, the operations computing system 200 can select and deploy a fleet of autonomous vehicles based on an operational domain in which the fleet is to be deployed and the capabilities of the autonomous vehicles in the fleet. Such selection and deployment can occur prior to an initial deployment of a fleet by a service entity and/or vehicle provider. Additionally, and/or alternatively, selection and deployment of a fleet can be made iteratively after initial deployment of a fleet. For example, operations computing system 300 can determine hourly, daily, or weekly how many autonomous vehicles to deploy in a fleet for an operational domain. In any event, by targeting a particular fleet of autonomous vehicles to an operational domain based on vehicle capabilities, a network of computing devices formed by the autonomous vehicles of the fleet can be optimized to avoid non-essential use of computing resources.

Figure 3:
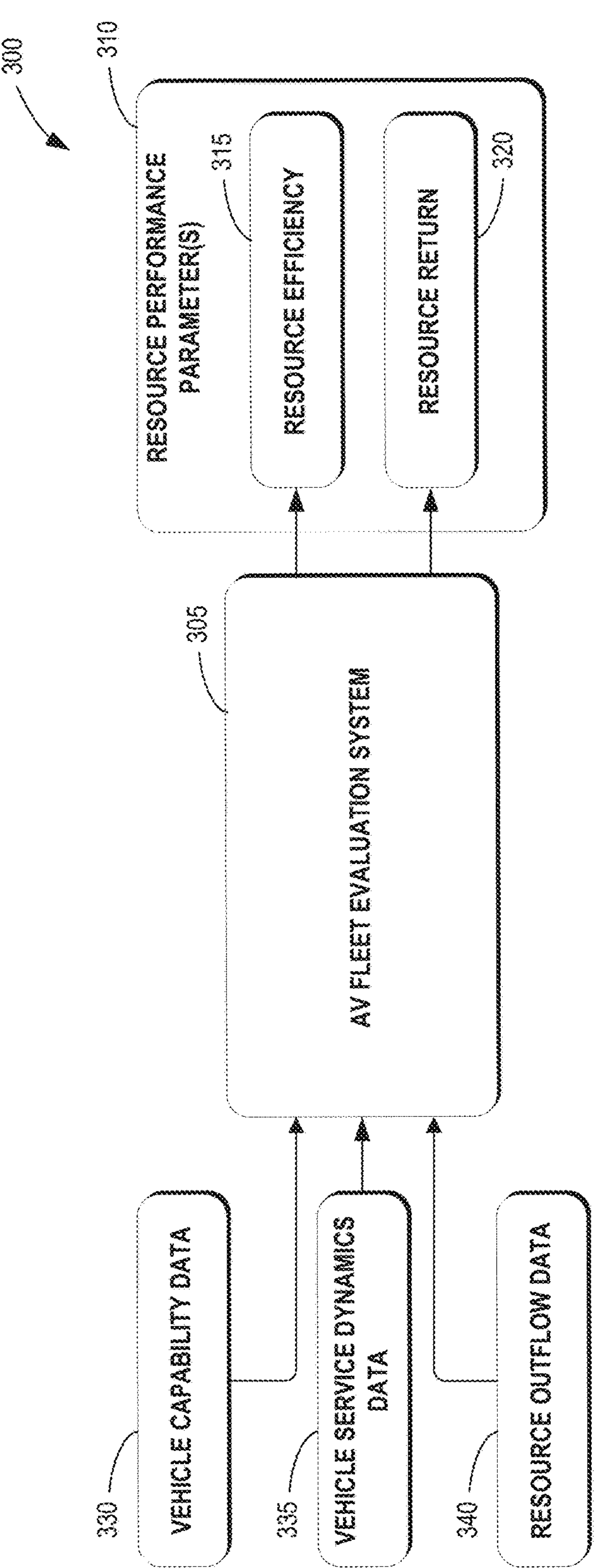
FIG. 3 depicts an example computing system for evaluating fleets of autonomous vehicles according to example embodiments of the present disclosure.

FIG. 3 depicts an example computing system 300 for evaluating fleets of autonomous vehicles according to example embodiments of the present disclosure. Computing system 300 includes an AV fleet evaluation system 305. In various examples, AV fleet evaluation system 305 may be implemented by an operations computing system 200 as described in FIG. 2. For example, AV fleet evaluation system 305 may be implemented as part of fleet deployment system 210 in some examples.

AV fleet evaluation system 305 can evaluate the deployment of fleets of autonomous vehicles based on data that indicates one or more capabilities of at least one autonomous vehicle and data that indicates vehicle service dynamics in an operational domain over a period of time. The AV fleet evaluation system 305 can initiate an action associated with a selected fleet of autonomous vehicles in the operational domain based on the resource performance parameters for the different fleets. For example, the AV fleet evaluation system can provide resource efficiency and/or resource return information associated with at least one of the fleets. The AV fleet evaluation system may indicate an optimal fleet size and respective efficiency and/or return information for the optimal fleet size. In this manner, a fleet deployment may be initiated based on resource performance parameters that indicate efficiency and/or return information associated with the analysis of various fleet sizes. As such, a network of computing devices formed by a selected fleet of autonomous vehicles can reduce data and processing requirements associated with fleets that are not optimized for a selected operational domain. In some examples, initiating a fleet deployment can include issuing instructions to place one or more autonomous vehicles into operation for performing a vehicle service.

More particularly, AV fleet evaluation system 305 can receive vehicle capability data 330, vehicle services dynamics data 335, and/or resource outflow data 340. AV fleet evaluation system 305 can generate one or more resource performance parameters 310 based on an evaluation of different candidate fleets of autonomous vehicles according to the vehicle capability data 330, vehicle services dynamics data 335, and/or resource outflow data 340. The various data may be received from one or more storage devices, such as a local cache. In some examples, each fleet includes a different number of autonomous vehicles. Additionally, and/or alternatively, the autonomous vehicles associated with different fleets may include different vehicle capabilities.

In some examples, the AV fleet evaluation system 305 can evaluate fleets of autonomous vehicles for operations in an operational domain based on the capabilities of an autonomous vehicle and vehicle service dynamics within the operational domain. A computing system can obtain a level of addressability for an operational domain that is based on a capability of an autonomous vehicle. For example, the level of addressability for an operational domain may indicate a number of travel routes that are traversable by an autonomous vehicle in the operational domain. AV fleet evaluation system 305 can determine a number of service requests that are serviceable by an autonomous vehicle based on the vehicle service dynamics data 335 and the number of travel routes traversable by the autonomous vehicle.

The vehicle service dynamics data may include data associated with usage of one or more vehicles within the operational domain for a vehicle service. The usage data may be associated with one or more vehicle types, such as autonomous or non-autonomous vehicles, within the operational domain. Usage data may include data indicative of at least one of supply hours, demand hours, service-hours, service miles, efficiency, or utilization. In some examples, vehicle service dynamics data can include a growth factor that allows the system to scale historical service requests higher or lower according to expected growth or declines. A growth factor can be applied for every hour or in other increments such as days, years, etc. Historical and/or future vehicle service dynamics data may be used.

Resource outflow data 340 can include a measure of operation or deployment associated with at least one autonomous vehicle. In some examples, a measure of operation or deployment can include a cost measure. The cost measure may include a fixed and/or variable cost.

AV fleet evaluation system 305 can generate resource performance parameters 310 respectively for a plurality of candidate autonomous vehicle fleets for potential deployment in an operational domain. The resource performance parameter(s) for each candidate autonomous vehicle fleet can include a resource efficiency 315 parameter and/or a resource return 320 parameter. The resource performance parameter(s) can be generated based at least in part on the capabilities of an autonomous vehicle, the vehicle service dynamics associated with an operational domain, and/or the resource outflow data associated with the autonomous vehicles. In example embodiments, the computing system can analyze a plurality of autonomous vehicle fleets and determine one or more optimal autonomous vehicle fleets, such as one or more optimal autonomous vehicle fleet sizes.

Based on the capabilities of an autonomous vehicle and the vehicle service dynamics associated with an operational domain, a measure of predicted efficiency and/or resource return can be determined for the plurality of autonomous vehicle fleets. By way of example, the computing system can output a fleet size and a total efficiency and/or resource return expected for a particular fleet size. The fleet size and total efficiency and/or resource return can be provided for various profiles. For example, different input data reflecting different vehicle capabilities and/or different vehicle service dynamics information can be used to generate outputs for multiple profiles. In some examples, a measure of resource return can include a measure of profitability associated with a fleet of autonomous vehicles. In some examples, a resource performance parameter may indicate a measure of breakeven utilization based at on a number of autonomous vehicles having a total resource outflow per unit that is equal to a total resource outflow per unit for a fleet of non-autonomous vehicles.

AV fleet evaluation system 305 and/or operations computing system 200 can initiate various actions in response to the evaluation of one or more candidate fleets of autonomous vehicles. AV fleet evaluation system 305 can rank autonomous vehicle fleets, provide resource performance information such as efficiency and/or return information associated with autonomous vehicle fleets, determine an appropriate fleet to deploy for a particular operational domain, prioritize vehicle technology development for fleets of autonomous vehicles, etc. In this way, AV fleet evaluation system 305 can provide a more computationally efficient approach for evaluating and selecting fleets of autonomous vehicles that will lead to higher autonomous vehicle usage, thereby reducing potential computational waste. Additionally, the resource performance parameters generated by AV fleet evaluation system 305 may be used to deploy one or more autonomous vehicles in an operational domain during a particular time period.

Figure 13:
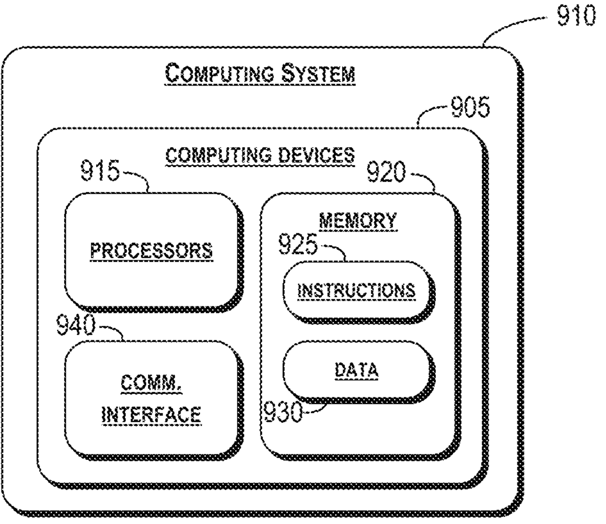
FIG. 13 depicts example system components according to example embodiments of the present disclosure.

FIG. 4 depicts an example data structure 400 including data indicating a plurality of autonomous vehicle capabilities according to example embodiments of the present disclosure. The data structure 400 can be stored in an accessible memory, such as a memory 920 as shown in FIG. 13 and/or a local cache, accessible to AV fleet evaluation system 305. The data structure 400 can include a table, a hierarchy, a list, and/or other types of data structures. The data structure 400 can include data indicative of a plurality of autonomous vehicle capabilities. The vehicle capability data 330 of FIG. 3 can be or include one or more of the autonomous vehicle capabilities depicted in FIG. 4 in some examples. An operations computing system 200 (and/or another type of computing system) can access memory to obtain data indicative of one or more of the autonomous vehicle capabilities.

A data structure 400 can include data indicating any number and type of autonomous vehicle capabilities in various implementations. The capabilities can include capabilities that are currently being and/or planned to be developed. An autonomous vehicle capability can be indicative of an ability of an autonomous vehicle such as, for example, an ability that helps the vehicle autonomously operate (e.g., with little or no operator input). For instance, the capabilities can be indicative of the vehicle's ability to operate (e.g., perceive its surroundings, predict object motion, plan vehicle motion, etc.) in certain weather condition(s) (e.g., rain, snow, sleet, etc.). Additionally or alternatively, the capabilities can be indicative of vehicle operating condition(s) (e.g., a vehicle's max speed, horizontal field of view, etc.). Additionally, or alternatively, the capabilities can be indicative of a vehicle maneuverability (e.g., vehicle can handle unprotected left turns, U-turns, four-way intersections, etc.). The computing system can obtain data indicative of one or more capabilities of an autonomous vehicle from a local and/or remote memory that stores such data.

FIG. 4 includes an example of a set of autonomous vehicle capabilities that may be indicated in a data structure 400. A temperature capability may indicate a maximum and/or minimum temperature at which the autonomous vehicle can operate. In some examples, a range of operating temperatures can be indicated. A precipation intensity capability can indicate a maximum allowable precipitation intensity (e.g., inches per hour) under which an autonomous vehicle can operate. A precipitation type capability may indicate, for one or more precipitation types, whether the autonomous state vehicle as capability of operation during that precipitation type. For example, a binary value may be used to indicate yes/no for each precipitation type. A sun angle capability (azimuth) may indicate a range of sun angles (for example, between X and Y degrees) under which the autonomous vehicle may operate. Integer values may be used in some examples, such as where an integer value of 0 indicates night and ranges between 0 and 10 indicate periods between Dawn and dusk. A visibility capability may indicate a minimum visibility (e.g., miles) under which the autonomous vehicle can operate. A humidity capability may indicate a maximum allowable humidity (e.g., X percent) under which the autonomous vehicle can operate. Relative values between 0 and 1 can be used in example embodiments. A dewpoint capability can indicate a range of dewpoints (e.g., min/max) under which the autonomous vehicle can operate. The apparent temperature capability can indicate a range of temperatures (e.g., min/max) in which the autonomous vehicle can operate. A precipitation probability capability may indicate a maximum allowable probability (e.g., percent) under which of autonomous vehicle can operate. For example a probability between 0 and 1 can be used. A cloud cover capability may indicate a range of cloud cover (min/max) under which the autonomous vehicle can operate. The cloud cover capability may be indicated as a percentage of occludedness using values between 0 and 1 in example embodiments. A windspeed capability may indicate a maximum allowable windspeed (e.g., miles per hour) under which the autonomous vehicle can operate. A UV index capability can indicate the maximum allowable UV (e.g., ranges) under which the autonomous vehicle can operate.

A speed capability may indicate a speed or time that the autonomous vehicle should be able to complete a service request (e.g., of a particular distance) within. For example the speed capability may indicate a number of minutes or a percentage of a time to destination that an autonomous vehicle can take. A maximum speed capability may indicate a maximum speed at which the autonomous vehicle is able to operate. A road type capability may indicate for one or more road types whether the autonomous vehicle is capable of operating on such a road type. For example, a road type capability may indicate whether the autonomous vehicle is able to operate on a nominal road type, alley, driveway, highway, interchange, entrance ramp, exit ramp, cul-de-sac, dead-end, frontage road, access limited road, toll-road, and/or other road types. A minimum land width capability may indicate a minimum lane size upon which the autonomous vehicle is capable of operating. A lane type capability may indicate for one or more lane types whether the autonomous vehicle is capable of operating within such a lane type. For example, a lane type capability may indicate a normal, non-autonomous, and/or routable lane type. A lighting capability (also known as light pollution) may indicate for one or more lighting conditions whether the autonomous vehicle is capable of operation. A road grade or vertical field of view capability may indicate a maximum road grade at which the autonomous vehicle is capable operation. The road grade capability may also indicate a negative road grade at which the autonomous vehicle is capable of operation. A vertical field of view capability may indicate a maximum and/or minimum field of view of which the autonomous vehicle is capable operation. A horizontal field of view capability may indicate a minimum field of view (e.g., in degrees) at which the autonomous vehicle is capable of operation.

A U-turn capability may indicate whether the autonomous vehicle is capable of making U-turns. A maximum cross traffic speed for merges capability may indicate a maximum cross traffic speed at which the autonomous vehicle is able to merge. An all-way stop intersections capability may indicate whether the autonomous vehicle is capable of handling all-way stops. An unprotected right capability may indicate whether the autonomous vehicle is capable of taking an unprotected right-hand turn. An unprotected left capability may indicate whether the autonomous vehicle is capable of performing an unprotected left-hand turn. An unprotected straight capability may indicate whether the autonomous vehicle is capable of proceeding straight unprotected through an intersection. A lane changes capability may indicate whether the autonomous vehicle is capable of making lane changes. A turning through bike lanes capability may indicate whether the autonomous vehicle is capable of turning through bike lanes FIG. 5 depicts an example data structure 450 including data indicating vehicle service dynamics associated with an operational domain according to example embodiments of the present disclosure. Similar to data structure 400, data structure 450 can be stored in an accessible memory, such as a memory 920 as shown in FIG. 13 and/or a local cache, accessible to AV fleet evaluation system 305. The data structure 450 can include a table, a hierarchy, a list, and/or other types of data structures. The data structure 450 can include data indicative of a plurality of vehicle service dynamics. The vehicle service dynamics data 335 of FIG. 3 can be or include the vehicle service dynamics in FIG. 5. An operations computing system 200 (and/or another type of computing system) can access memory to obtain data indicative of one or more of the vehicle service dynamics.

FIG. 5 includes an example of a set of vehicle service dynamics associated with an operational domain. The vehicle service dynamics data may be associated with one or more vehicle types. For example, the vehicle service dynamics data may be associated with non-autonomous vehicles and/or autonomous vehicles. In this particular example, the vehicle service dynamics data structure 450 includes supply hours, demand hours, service-hours, service miles, en route hours, open hours, efficiency, and utilization. It will be appreciated that more or fewer vehicle service dynamics may be included in a data structure 450 in accordance with various embodiments.

The supply hours may indicate a number of supply hours associated with a vehicle service in an operational domain. The demand hours may indicate a number of demand hours associated with the vehicle service in the operational domain. The service-hours may indicate a number of service-hours associated with the vehicle service in the operational domain. The service miles may indicate a number of service miles associated with the vehicle service in the operational domain. Data structure 450 may additionally include data indicative of a number of en route hours of an autonomous vehicle in a year and open hours in a year. The en route hours may indicate a number of hours that an autonomous vehicle spends en route to begin a service for a vehicle service request. The open hours may indicate a number of hours that a vehicle spends waiting to begin a service for a vehicle service request. It will be appreciated that the units (e.g. hours, miles, etc.) depicted in FIG. 5 are provided by way of example only. Any suitable units may be used to indicate vehicle service dynamics data.

The utilization may indicate the utilization associated with the vehicle service in the operational domain. The utilization may indicate a fraction of time in a year or other time period that a vehicle spends in service. The efficiency may indicate an efficiency associated with the vehicle service in the operational domain. The efficiency may indicate a fraction of in-service time that a vehicle spends on service requests. Although not shown, data structure 450 may additionally include data indicative of a total number of service requests serviced in a year or other time period.

FIG. 6 depicts an example data structure 470 including data indicating resource outflows associated with one or more vehicle types according to example embodiments of the present disclosure. The data structure 470 can be stored in an accessible memory, such as a memory 920 as shown in FIG. 13 and/or a local cache, accessible to AV fleet evaluation system 305. The data structure 470 can include a table, a hierarchy, a list, and/or other types of data structures. The data structure 470 can include data indicative of a plurality of resource outflows. For example, the vehicle resource outflow data 340 of FIG. 3 can be or include the resource outflows in FIG. 6. An operations computing system 200 (and/or another type of computing system) can access memory to obtain data indicative of one or more of the resource outflows.

A data structure 470 indicating resource outflows may include resource outflows associated with one or more vehicle types. FIG. 6 includes an example of a set of resource outflows associated with an autonomous vehicle type and a non-autonomous vehicle type. In this particular example, the resource outflows data structure 470 includes a cost-per-hour (AV fixed) and a cost-per-mile (AV variable) for an autonomous vehicle. Additionally, data structure 470 includes a cost-per-mile (Non-AV Fixed) and price-per-mile (Non-AV Fixed) for a non-autonomous vehicle (e.g., human-operated). The cost-per-hour (AV fixed) indicates an hourly or other time-based capital cost that is incurred per unit of time independent of whether the AV vehicle is in-use by a vehicle service or not. The cost-per-mile (AV variable) indicates a variable cost incurred per unit of distance if the autonomous vehicle is in use. The cost-per-mile (Non-AV Variable) indicates a variable cost incurred per unit of distance if the non-autonomous vehicle is in use. The price-per-mile (Non-AV Variable) indicates a variable price received per unit of distance if the non-autonomous vehicle is in use. Although not shown, a fixed cost per hour can be provided for a non-autonomous vehicle in some examples. Moreover, it will be appreciated that more or fewer resource outflows may be included in a data structure 470 in accordance with various embodiments. In some examples, a data structure 470 may be provided for additional or fewer vehicle types. Additionally, the resource outflow data may be specific to a particular operational domain in some embodiments. Moreover, the resource outflow data may be specific for particular autonomous vehicle capabilities in some examples. In this manner, a fleet of autonomous vehicles can be evaluated based on operational domain-specific resource outflows and autonomous vehicle capabilities.

Figure 7:
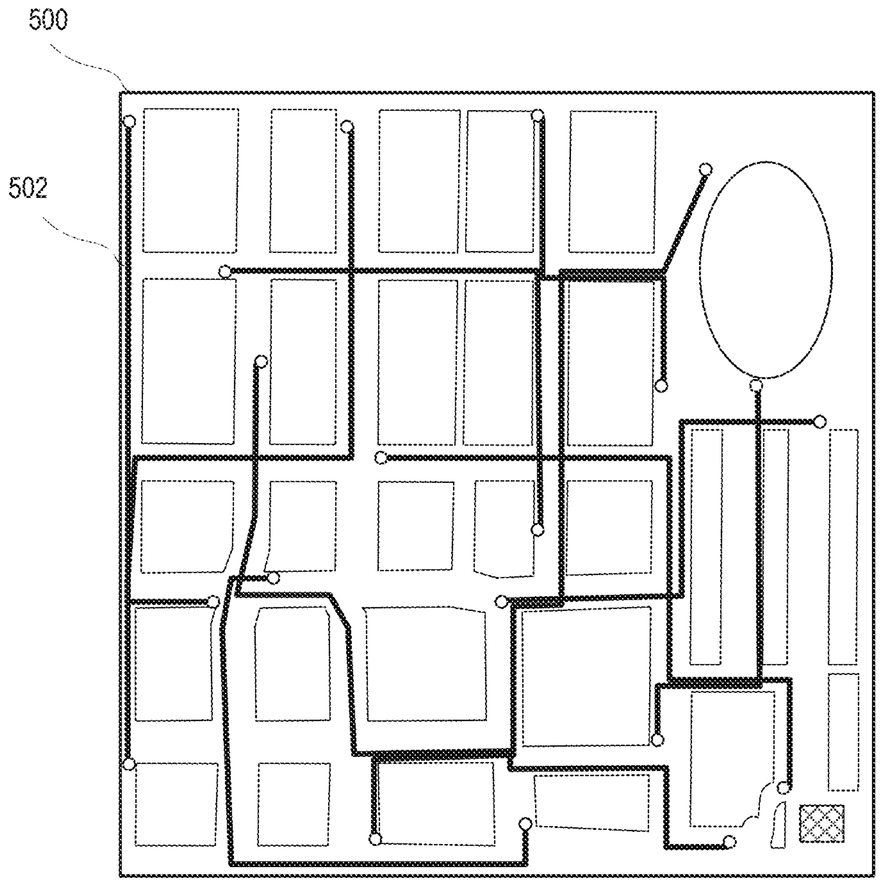
FIG. 7 depicts an example operational domain according to according to example embodiments of the present disclosure.

FIG. 7. depicts an example operational domain 500 in which a fleet of autonomous vehicles may operate to provide vehicle services. The identified operational domain 500 can include, for example, a geographic area in which a service entity may consider utilizing autonomous vehicles to provide vehicle services. For instance, this may include a city in which transportation services are currently provided by non-autonomous vehicles (and their) drivers, but not autonomous vehicles. In some implementations, identified operational domain(s) can include geographic area(s) in which a service entity does not utilize any vehicles (non-autonomous or autonomous) to provide vehicle services. This can include, for example, markets that are being serviced by other service entities. In some implementations, the identified operational domain(s) can include geographic area(s) in which a service entity previously and/or currently utilizes both non-autonomous and autonomous vehicles to provide vehicle services, but aims to conduct further analysis of the geographic area.

A computing system (e.g., associated with a service entity) can evaluate various fleets of autonomous vehicles to determine which fleet would be most appropriate for operation in a particular operational domain 500. A computing system can evaluate fleets of autonomous vehicles for operations in an operational domain based on the capabilities of an autonomous within the operational domain. A computing system can obtain a level of addressability for an operational domain that is based on a capability of an autonomous vehicle. For example, the level of addressability for an operational domain may indicate a number of travel routes that are serviceable by an autonomous vehicle in the operational domain.

A computing system can determine a level of addressability for an operational domain given a capability of the autonomous vehicle. For instance, a computing system can obtain data indicative of various capabilities of the autonomous vehicle. This can include, for example, capabilities that are currently being and/or planned to be developed (e.g., the ability to make an unprotected left turn, the ability to operate in heavy snowfall, etc.). The computing system can also obtain data indicative of the potential travel routes 502 within the operational domain (e.g., various travel routes for transporting users). The computing system can determine how many of these potential routes could be traversed by an autonomous vehicle given a capability. For example, the computing system can determine how many of these routes could be traversed by an autonomous vehicle if the autonomous vehicle was capable of performing an unprotected left turn. The computing system can determine a level of addressability for the operational domain based on the number of traversable routes (e.g., indicating the accessibility of that operational domain to the autonomous vehicle). The plurality of resource performance parameters determined for a plurality of autonomous vehicle fleets can be based at least in part on the level of addressability of the operational domain. The data indicative of an addressability of the operational domain can include data indicative of vehicle service requests that are serviceable by the at least one autonomous vehicle in the operational domain.

To help evaluate an operational domain, the computing system can obtain data associated with a plurality of potential travel routes 502 within the operational domain. Such data can be obtained via a local memory and/or a remote memory that stores travel route data associated with the operational domain. Each of the plurality of potential travel routes can start and end within the operational domain. For instance, in some implementations, the plurality of travel routes can be based at least in part on the travel routes within the operational domain that can be traversed by non-autonomous, human-driven vehicles.

In some implementations, the plurality of travel routes can be based on historical travel route data. For example, the computing system can obtain data indicative of the travel routes previously traversed by non-autonomous vehicles when providing vehicle services within the operational domain (e.g., when transporting users from one location to another). These historically travelled routes can provide real-world examples of the types of routes that may need to be utilized by autonomous vehicles to provide vehicle services within the operational domain. In some implementations, the historic travel route data can be constrained to a particular time period (e.g., within the past 6 months, 12 months, 24 months, etc.).

Additionally, or alternatively, the plurality of travel routes can be based at least in part on simulated travel route data. For example, a simulation can be run to generate a number of simulated travel routes in an operational domain given a variety of vehicle service assignments. This can allow an operational domain to be evaluated without real-world travel route data associated therewith (e.g., for prospective markets with little or no vehicle presence). In some implementations, the plurality of travel routes can be based at least in part on predicted travel route data. For example, the plurality of travel routes for one operational domain can be predicted based on the real-world and/or simulated travelled routes extrapolated from another operational domain (e.g., with like circumstances, travel ways, infrastructure, etc.).

The computing system may obtain other information associated with the operational domain (other than the plurality of travel routes). For instance, the computing system can obtain information indicative the weather associated with an operational domain. Such information can indicate where, how often, and how much snow, rain, sleet, and/or other weather conditions are experienced by the operational domain. Additionally, or alternatively, the computing system can obtain information indicative of a regulation or policy associated with an operational domain. For example, a city may have regulations that restrict autonomous vehicles from operating in certain portions of the city. Additionally, or alternatively, the computing system can obtain information indicative of the light conditions associated with the operational domain (e.g., frequency and brightness of street lighting, sun exposure, tree coverage, etc.). Additionally, or alternatively, the computing system can obtain object data associated with the operational domain. The object data can be indicative of the types, numbers, trends, etc. of the objects within the operational domain. For example, the object data can indicate whether a particular operational domain (e.g., city) has a high number of trees, pedestrians, bicyclists, etc.

The operational domain(s) can be evaluated based at least in part on one or more vehicle capabilities. A capability can be indicative of an ability of an autonomous vehicle such as, for example, an ability that helps the vehicle autonomously operate (e.g., with little or no operator input). For instance, the capabilities can be indicative of the vehicle's ability to operate (e.g., perceive its surroundings, predict object motion, plan vehicle motion, etc.) in certain weather condition(s) (e.g., rain, snow, sleet, etc.). Additionally or alternatively, the capabilities can be indicative of vehicle operating condition(s) (e.g., a vehicle's max speed, horizontal field of view, etc.). Additionally, or alternatively, the capabilities can be indicative of a vehicle maneuverability (e.g., vehicle can handle unprotected left turns, U-turns, four-way intersections, etc.). The computing system can obtain data indicative of one or more capabilities of an autonomous vehicle from a local and/or remote memory that stores such data.

The computing system can determine a level of addressability associated with an operational domain based at least in part on the one or more capabilities of the autonomous vehicle and the plurality of potential travel routes within the operational domain of the autonomous vehicle. In some implementations, the level of addressability can be determined based at least in part on the additional information associated with the operational domain (e.g., weather data, regulation/policy data, lighting conditions, object data, etc.). The level of addressability can be indicative of the ability of the autonomous vehicle to operate within the operational domain. Moreover, the level of addressability can be indicative of the level of usage that an autonomous vehicle may experience in an operational domain (e.g., for performing vehicle services). To determine the level of addressability of an operational domain, the computing system can determine the number of the potential travel routes that are traversable by the autonomous vehicle within the operational domain based at least in part on the one or more capabilities of the autonomous vehicle.

The level of addressability can be calculated based on various factor(s). In some implementations, the level of addressability can be measured by the number of potential travel routes that are determined to be traversable by the autonomous vehicle (e.g., the higher number of potential travel routes—the higher the level of addressability). The number of potential travel routes can be represented as an integer, a percentage (e.g., 50%), a fraction (e.g., 50 out of 100 routes), and/or another type of classification (e.g., low, moderate, high, etc.). In some implementations, the level of addressability can be measured based on a travel distance associated with the number of the potential travel routes that are traversable by the autonomous vehicle (e.g., an aggregate number of miles, kilometers, etc. of the potential travel routes that are traversable by the autonomous vehicle). This distance can represent a potential amount of distance that would be travelled by an autonomous vehicle while performing vehicle services. In such as case, the level of addressability can be higher for a greater distance (e.g., reflecting a reduced amount of potential idle time). The travel distance can be represented as an integer (e.g., 75 miles, etc.), a percentage (75% of the possible mileage, etc.), a fraction (e.g., 75/100 miles, etc.), and/or another type of classification (e.g., low, moderate, high, etc.).

In some implementations, the level of addressability can be based at least in part on a service time associated with the potential travel routes that are traversable by the autonomous vehicle. For example, the computing system can determine an aggregate amount of time that an autonomous vehicle would be travelling along the travel routes (e.g., when addressing service requests). A greater amount of time can be indicative of a greater usage rate (and less idle time). In such an example, the longer the amount of service time, the higher the level of addressability. The time can be represented as an integer, a percentage, a fraction, and/or another type of classification (e.g., low, moderate, high, etc.).

In some implementations, the level of addressability can be based at least in part on a number of predicted service requests associated with the potential travel routes that are traversable by the autonomous vehicle. For example, the potential travel routes can be associated with real-world travel routes that were traversed by non-autonomous vehicles while performing a vehicle service in accordance with a user's service request (e.g., transporting a user to a requested destination). Each of potential travel routes can be associated with a projected number of service requests that is based at least in part on an associated number of real-world service requests. A higher number of predicted service requests can be indicative of a higher potential usage rate (and lower idle time) of the autonomous vehicle. Accordingly, the operational domain can be afforded a higher level of addressability for a greater number of predicted service requests. Additionally, or alternatively, the level of addressability can be based at least in part on a level of predicted revenue associated with the potential travel routes that are traversable by the autonomous vehicle. The level of revenue can be calculated based on the projected service requests associated with the potential travel routes. The number of service requests and/or revenue can be represented as an integer, a percentage, a fraction, and/or another type of classification (e.g., low, moderate, high, etc.).

In some implementations, the level of addressability can be based on a comparison of how a vehicle service would be performed by a non-autonomous vehicle versus how the vehicle service would be performed by an autonomous vehicle. For example, the computing system can obtain data that indicates a pick-up location, travel route, destination location, and travel time associated with a first service that transports a user from one location to another within an operational domain via a non-autonomous vehicle. This data can be based at least in part on real-world data. A simulation can be run to determine these parameters in the event that an autonomous vehicle is used to transport the user for the first service request. The system can compare this information to see whether an autonomous vehicle would perform the vehicle service as well as the non-autonomous vehicle. For example, in the event that the service time is substantially similar (e.g., within 30 seconds, 1 minute, etc.) and the non-autonomous vehicle is able to get similarly close to the pick-up and destination locations (e.g., within 10 m, 20 m, etc.), the level of addressability can be increased. However, in the event that the autonomous vehicle would take significantly longer to complete the vehicle service and/or be unable to arrive proximate to the pick-up and/or destination locations, the level of addressability can be decreased.

The computing system can evaluate multiple capabilities across an operational domain to determine which capabilities would have the greatest effect on the level of addressability for that operational domain. For instance, the computing system can obtain data indicative of a first capability (e.g., the ability to operate in heavy snow) and a second capability (e.g., the ability to perform an unprotected left turn). The computing system can determine the level of addressability for a first operational domain (e.g., City A) for each capability. For example, the computing system can determine a first level of addressability for the first operational domain (e.g., City A) based at least in part on the first capability (e.g., the ability to operate in heavy snow) and a second level of addressability for the first operational domain (e.g., City A) based at least in part on the second capability (e.g., the ability to perform an unprotected left turn). This can allow the computing system to determine what the level of addressability would be for City A if the autonomous vehicle was able to operate in heavy snow and/or if the autonomous vehicle was able to perform an unprotected left turn. Moreover, the computing system can compare the first level of addressability and the second level of addressability to help determine which capability would lead to higher vehicle usage in the first operational domain.

By way of example, the second capability (e.g., the ability to perform an unprotected left turn) may lead to a higher level of addressability for City A than the first capability (e.g., the ability to operate in heavy snow) in the event that the second capability would allow for a greater number of potential travel routes, travel distance, projected service requests, service time, projected revenue, etc. in City A. The computing system can continue this analysis by iterating over additional capabilities and/or operational domains. This can allow the computing system to recommend that the development of one of the capabilities (e.g., the ability to perform unprotected left turns) be prioritized over the development of another (e.g., the ability to operate in heavy snow).

In some implementations, the computing system can evaluate operational domain(s) on a more granular level. For instance, as described herein, an operational domain can include one or more sub-regions (e.g., neighborhoods). The computing system can be configured to perform a similar type of analysis (as described herein) on the sub-region(s) of the operational domain to determine a level of addressability for each of the sub-region(s). By way of example, an operational domain (e.g., City A) can include a first sub-region (e.g., Neighborhood X) and a second sub-region (e.g., Neighborhood Y). For each sub-region, the computing system can determine a level of addressability in a similar manner as that described herein (e.g., based on the potential travel routes within that sub-region and one or more capabilities of the autonomous vehicle). The computing system can determine which sub-regions may lead to higher vehicle usage rates (and less idle time) based on the respective levels of addressability. Ultimately, as further described herein, this can help determine the boundaries within which an autonomous vehicle can operate in an operational domain and/or suggested retrieval and drop-off locations.

Additionally, or alternatively, the computing system can be configured to evaluate the individual travels ways (e.g., the associated lanes) and potential travel routes within a sub-region to determine which may be the most appropriate for autonomous vehicle operation. As described herein, a sub-region (e.g., a neighborhood, etc.) can include a plurality of travel ways (e.g., roads, etc.) and the travel ways can include lanes and/or other designated portions for traversing the travel ways. The computing system can obtain data indicative of a plurality of potential travel routes that utilize the travel ways within that sub-region. The computing system can evaluate these travel routes to determine which travel ways, lanes, other designated portions, etc. would be most appropriate for autonomous vehicle operation. By way of example, the computing system can determine a level of addressability of a particular travel way, lane, other designated portion, etc. based at least in part on the density of projected service requests associated therewith (e.g., based on historical/simulated/predicted service requests that would involve using that travel way, etc.), restrictions/policies associated therewith (e.g., whether a particular lane allows for autonomous vehicles, is under construction, etc.), estimated travel time, etc. Ultimately, this can allow the computing system to formulate a recommendation as to which potential travel routes within an operational domain would be most efficient for an autonomous vehicle.

Figure 8:
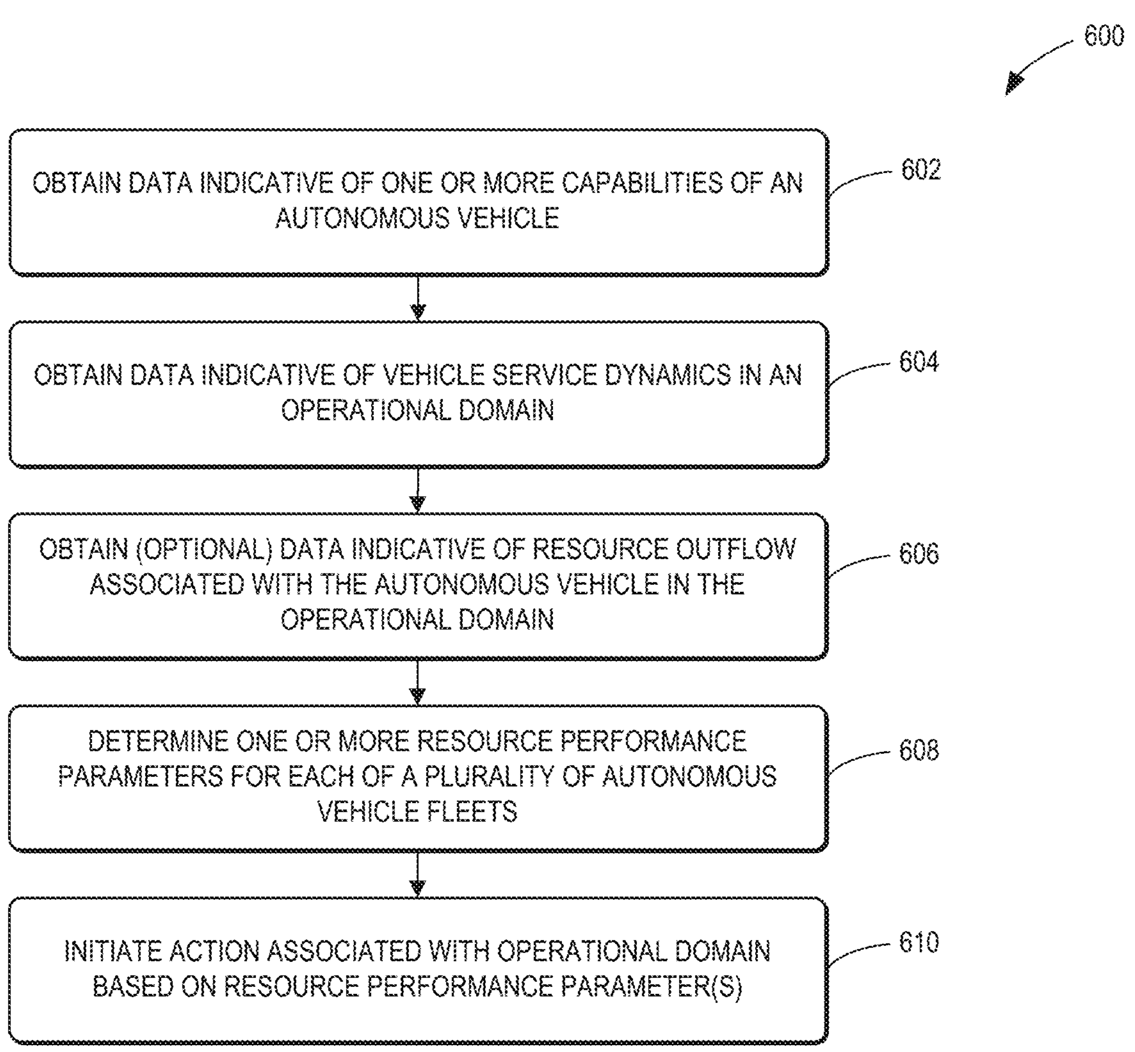
FIG. 8 depicts a flowchart illustrating an example method for determining resource performance parameters for autonomous vehicle fleets according to example embodiments of the present disclosure.

FIG. 8 depicts a flowchart illustrating an example method for determining resource performance parameters for autonomous vehicle fleets and initiating an action in an operational domain based on the resource performance parameters according to example embodiments of the present disclosure. One or more portions of method 600 (and the other methods described herein such as method 650 of FIG. 9) can be implemented by one or more computing devices such as, for example, one or more computing devices of vehicle computing system 100 of FIG. 1, operations computing system 200 of FIG. 2, or computing system 910 of FIG. 13. One or more portions of method 600 and/or method 650 can be implemented as an algorithm on the hardware components of the devices described herein (e.g., as in FIGS. 1, 2, 3, and 13) to, for example, initiate an action associated with a fleet of autonomous vehicles in an operational domain. In example embodiments, method 600 and/or method 650 may be performed by an AV fleet evaluation system 305 implemented using one or more computing devices of a remote computing system (e.g., 200).

At 602, the computing system, such as an operations computing system 200, obtains data indicative of one or more capabilities of an autonomous vehicle. For example, the computing system can obtain data indicative of one or more of the capabilities depicted in data structure 400 of FIG. 4.

At 604, the computing system obtains data indicative of vehicle service dynamics in an operational domain. For example, the computing system can obtain data indicative of one or more of the vehicle service dynamics depicted in data structure 450 of FIG. 5.

At 606, the computing system optionally obtains data indicative of one or more resource outflows associated with an autonomous vehicle and optionally a non-autonomous vehicle or other vehicle type. For example, the computing system can obtain data indicative of one or more of the resource outflows depicted in data structure 470 of FIG. 6.

At 608, the computing system determines one or more resource performance parameters for each of a plurality of autonomous vehicle fleets. The one or more resource performance parameters can be based at least in part on the one or more capabilities of the autonomous vehicle, the vehicle service dynamics, and optionally the one or more resource outflows. As an example, the computing system may determine from the one or more capabilities of the autonomous vehicle routes that are traversable by the autonomous vehicle in the operational domain. Based on demand information from the vehicle service dynamics, the computing system may determine a number of service requests that are serviceable by the autonomous vehicle based on the potential travel routes. The computing system may then determine one or more resource performance parameters based on the number of serviceable service requests and the one or more resource outflows.

By way of example, the computing system may calculate a time efficiency associated with an overall fleet and/or a marginal vehicle within the fleet. The computing system can convert a time efficiency into a mileage efficiency. A mileage efficiency can then be used as an input to determine one or resource performance parameters. For example mileage efficiencies can be used to compute a cost-per-mile or other resource performance parameters associated with the fleet of autonomous vehicles within the operational domain. The one or more resource performance parameters may include one or more of a resource efficiency or a resource return. Resource efficiencies may include one or more fleet efficiencies and/or one or more marginal vehicle efficiencies. Resource returns may include a fleet profitability and/or a marginal vehicle profitability.

In some examples, a resource performance parameter can indicate a level where a cost of providing marginal hours of supply using vehicles of a first type (e.g., autonomous) is equal to the cost of providing marginal hours of supply using vehicles of the second type (e.g., non-autonomous). This level may be referred to as a breakeven utilization of the first vehicle type. In some examples, the breakeven utilization may indicate an optimal number of autonomous vehicles for a fleet to be deployed in an operational domain. A measure of breakeven utilization can be based at least in part on a number of autonomous vehicles having a total resource outflow per unit that is equal to a total resource outflow per unit for a fleet of non-autonomous vehicles. In some instances, a total displaced market size of vehicles of a second type by vehicles of a first type can be determined given an average per-mile cost.

At 610, the computing system can initiate one or more actions associated with the operational domain based on the resource performance parameters. For example, the computing system can provide resource efficiency and/or resource return information associated with at least one of the fleets. The computing system may indicate an optimal fleet size and respective efficiency and/or return information for the optimal fleet size. In this manner, a fleet deployment may be initiated based on resource performance parameters that indicate efficiency and/or return information associated with the analysis of various fleet sizes. As such, a network of computing devices formed by a selected fleet of autonomous vehicles can reduce data and processing requirements associated with fleets that are not optimized for a selected operational domain.

In some examples, the computing system can rank autonomous vehicle fleets, provide resource performance information such as efficiency and/or return information associated with autonomous vehicle fleets, determine an appropriate fleet to deploy for a particular operational domain, prioritize vehicle technology development for fleets of autonomous vehicles, etc. An action can include, for example, autonomous vehicle fleet (e.g., fleet size) selection, ranking, recommending, etc. as well as technology development prioritization. This process can be iterated for a plurality of fleets, a plurality of capabilities, a plurality of vehicle service dynamics, and/or a plurality of operational domains. For example, the process can be repeated for multiple profiles including different capabilities, vehicle service dynamics, and/or resource outflow data. In this way, the systems and methods described herein provide a more computationally efficient approach for evaluating and selecting fleets of autonomous vehicles that will lead to higher autonomous vehicle usage, thereby reducing potential computational waste.

Figure 9:
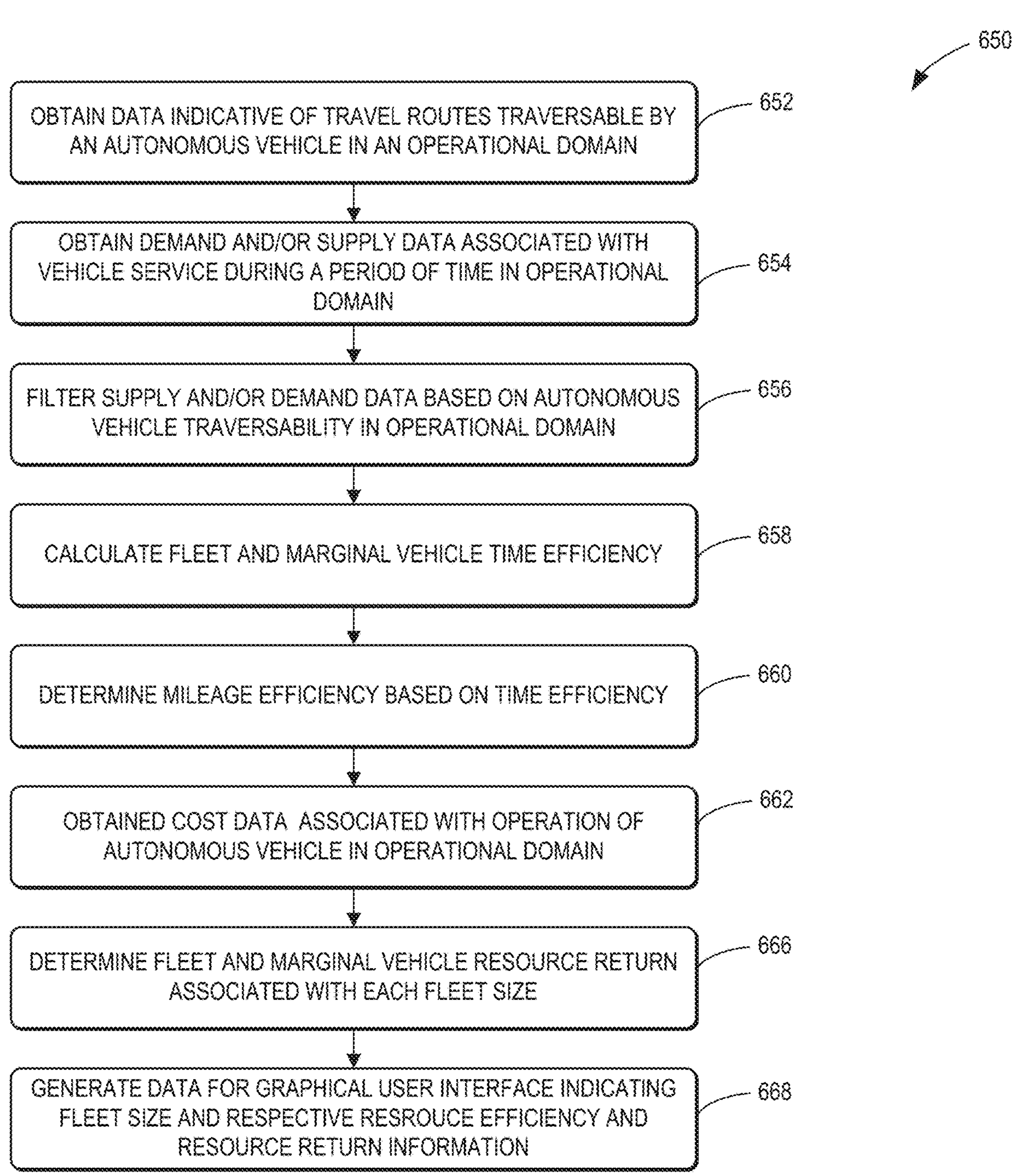
FIG. 9 depicts a flowchart illustrating an example method for determining resource performance parameters for autonomous vehicle fleets according to example embodiments of the present disclosure.

FIG. 9 depicts a flowchart illustrating an example method 650 for determining resource performance parameters for autonomous vehicle fleets according to example embodiments of the present disclosure. At 652, a computing system, such as operations computing system 200 including an AV fleet evaluation system 305, obtains data indicative of travel routes traversable by an autonomous vehicle that operational domain. As earlier described, the computing system may determine a number of travel routes based on a level of addressability of an operational domain. To determine the level of addressability, the computing system can determine the number of potential travel routes that are traversable by the autonomous vehicle within the operational domain based at least in part on one or more capabilities of the autonomous vehicle. The computing system can filter the plurality of potential travel routes within the operational domain based at least in part on a capability of the autonomous vehicle. For example, the computing system can obtain data indicative of a plurality of potential travel routes within a first operational domain (e.g., City A). The potential travel routes can be based on the real-world travel routes of City A that have been traversed by non-autonomous vehicles while providing vehicle services (e.g., transporting users) within the last twelve months. The computing system can determine how many of these potential travel routes would be traversable by an autonomous vehicle if the vehicle had one or more capabilities (e.g., the ability to make an unprotected left turn, make a U-turn, etc.) and/or how many of these potential travel routes would not be traversable by an autonomous vehicle if the vehicle did not have the particular capability (e.g., did not have the ability to make an unprotected left turn, U-turn, etc.). Additionally, or alternatively, the computing system can filter the plurality of potential travel routes based at least in part on other information associated with the geographic area. For example, in the event that current travel routes go through areas that prohibit autonomous vehicle operation, those potential travel routes would be identified as not traversable by the autonomous vehicle.

At 654, the computing system can obtain supply and demand data associated with vehicle service requests during the period of time in the operational domain. The supply and demand data may be associated with autonomous and/or non-autonomous vehicles. In some examples, demand data is obtained without obtaining supply data. The supply and demand data may include historical supply and demand data and/or future supply and demand data. For example, one or more models or forecasts may be used to predict future supply and demand information.

At 656, the computing system filters the demand and/or supply data based on the autonomous vehicle traversability in the operational domain. For example, the computing system may determine a measure of service-hour demand. The measure of service-hour demand can be determined by filtering the total service-hour to extract the number of service requests that would be serviceable by an autonomous vehicle. The measure of service-hour demand can be a measure of service-hours (or other unit of time) demanded in an hour that can be serviced by an autonomous vehicle. The measure of service request hours can be an average service-hour measure or can be a measure of service-hours for each hour of a day.

At 658, the computing system calculates a fleet time efficiency and a marginal vehicle time efficiency based on the measure of service-hours. The calculation of 658 can be performed for each of a plurality of fleet sizes being tested. The fleet time efficiency can represent an overall time as efficiency of an overall fleet. Marginal vehicle time efficiency can indicate the time efficiency of the marginal vehicle within the fleet.

At 660, the computing system converts the time efficiency to a mileage efficiency for each fleet size.

At 662, cost data and/or other resource outflow data associated with operation of the autonomous vehicle in the operational domain can be obtained. The cost data may include fixed and/or variable costs associated with autonomous vehicle operation in association with a vehicle service in the operational domain. Additionally, the cost data may optionally include cost data and/or resource out flow data associated with operation of a non-autonomous vehicle and the operational domain in accordance with the vehicle service.

At 664, the computing system determines a fleet efficiency and a marginal vehicle efficiency associated with each fleet size. At 666, a fleet resource return and a marginal vehicle resource return are determined for each fleet size.

At 668, the computing system generates data for a graphical user interface indicating a plurality of fleet sizes and respective resource efficiency and/or resource return information. The fleet resource return can indicate a fleet profitability in some examples. The fleet profitability may be shown with respect to the profitability of a fleet of non-autonomous vehicles in some examples. The marginal vehicle resource return can indicate a marginal vehicle profitability in some examples. The marginal vehicle profitability may be shown with respect to the profitability of a non-autonomous vehicle (e.g., human operator) performing the vehicle service.

FIG. 10 depicts an example of a graphical user interface 700 for providing fleet and respective resource performance parameter information according to example embodiments of the present disclosure. Graphical user interface 700 includes a plurality of columns depicting resource performance parameters associated with different autonomous vehicle fleets. Each row corresponds to a different autonomous vehicle fleet. A first column indicates a fleet size (e.g., number of cars) associated with the autonomous vehicle fleet. In some examples, a user may enter a range of fleet sizes and the computing system can calculate and display the respective resource performance parameters.

A second column of the graphical user interface indicates a market penetration associated with the corresponding autonomous vehicle fleet. Market penetration may be indicated as a percentage of total share of market in some examples. The third column indicates a fleet efficiency associated with the autonomous vehicle fleet. The fleet efficiency may indicate a percentage or fraction of in-service time that is spent on service assignments for an autonomous vehicle in the fleet. The fourth column indicates a fleet profitability. The fleet profitability may be indicated as a profitability relative to a non-autonomous vehicle performing the vehicle service in some examples. The fifth column indicates a fleet profitability relative to a price-per-mile of a non-autonomous vehicle performing the vehicle service. The sixth column indicates a marginal vehicle efficiency. Marginal vehicle efficiency may be indicative of a fraction of in-service time spent on service assignments by the marginal vehicle of the autonomous vehicle fleet. The seventh column indicates a marginal vehicle profitability. The marginal vehicle profitability may be indicated as a profitability relative to a non-autonomous vehicle performing vehicle service in some examples. The eighth column indicates a marginal vehicle profitability relative to a price-per-mile of a non-autonomous vehicle performing the vehicle service.

Although FIG. 10 depicts a specific set of resource performance parameters, it will be appreciated that a graphical user interface may provide indications of fewer or more resource performance parameters than those depicted in FIG. 10. For example, a graphical user interface may depict a breakeven utilization in some examples. The breakeven utilization may indicate a point where the total autonomous vehicle cost-per-mile is equal to a cost-per-mile for non-autonomous vehicle performing the vehicle service. In some examples, the breakeven utilization may indicate an optimal fleet size where a total autonomous vehicle cost-per-mile is equal to a cost-per-mile for a non-autonomous vehicle performing the vehicle service.

In accordance with some examples, a process for determining an optimal fleet size for a given operational domain accounts for factors including variation in demand hour to hour during a day. For a fixed asset like an autonomous vehicle, supply hours traditionally cannot be stored such that having 20 hours per day of available time per autonomous vehicle does not necessarily translate into 20 hours of supply availability to serve demand. For instance, supply hours available at 4 AM may not be used for morning rush-hour demand. How a fleet size translates into demand coverage in each hour based on an hourly demand can be considered. Additionally, it can be considered that the fleet size for an autonomous vehicle may be related to the marginal cost of using an autonomous vehicle relative to using a non-autonomous vehicle (e.g., human operated). It can be observed that at some level of fleet size, the cost of providing marginal hours of supply using an autonomous vehicle may be greater than the variable cost of providing supply hours with a non-autonomous vehicle. The disclosed technology can account for both of these effects.

As indicated, an estimate can be provided based on factors including a share of service requests (or assignments) that are serviceable by an autonomous vehicle, a breakeven utilization for an autonomous vehicle, the distribution of hourly supply-hour demand and corresponding implied optimal fleet size, a resulting average cost-per-mile for a vehicle service including autonomous and non-autonomous vehicles, and a total displaced market size given an average per-mile cost.

A detailed example is provided hereinafter. Let T denote a set of all service requests that are served annually in an operational domain such as a city. Let $A \subseteq T$ denote the set of these service requests that can be serviced by an autonomous vehicle, and let $\underline{A}=T-A$ denote the set of service requests that cannot be served by an autonomous vehicle. Let n(S) denote the average number of service-miles per hour from the set of service requests S.

Let ρ denote the hour-of-year utilization of an autonomous vehicle (fraction of hours in a year an autonomous vehicle spends in service). When an AV is in service, let e denote its efficiency, which can be defined as the fraction of in-service time spent on service requests.

It can be assumed that there are two main cost components for an AV. A first component can be an hourly (time-based) capital cost $h_{av}$ that is incurred per unit of time independent of whether the vehicle is used or not. A second component can be a variable cost, $m_{av}$. It can be assumed that a non-autonomous vehicle incurs only a per-mile variable cost of $m_p$ in some examples. In other examples, an hourly capital cost can be attributed to a non-autonomous vehicle as well. Let a denote the average number of vehicle on-service-hours per service mile. The breakeven (critical) utilization, $\rho_c$, is the point where the total AV cost-per-mile is equal to the non-AV cost-per-mile as set forth in Equations 1 and 2:

$$m_p = m_{av} + (a/\epsilon\rho)h_{av} \quad \text{Equation 1}$$

or $$\rho_c = ah_{av}/\epsilon(m_p - m_{av}) \quad \text{Equation 2}$$

Figure 11:
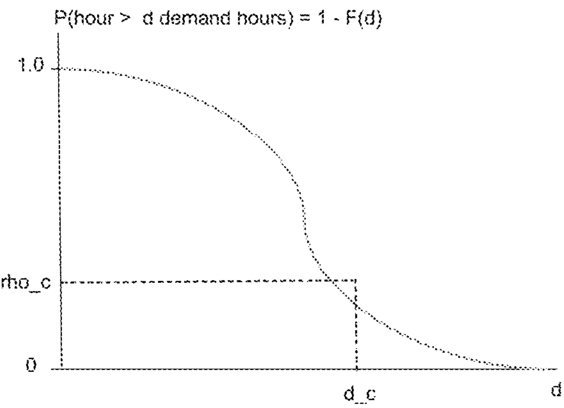
FIG. 11 depicts a graphical representation illustrating an example distribution of service hours demanded in in each hour of the day.

It may be useful to consider the distribution of hourly service-hours and optimal fleet size. FIG. 11 depicts, for all hours of the day in a year, the complementary distribution of the number of service-hours demanded in each hour for some set of autonomous vehicle feasible service requests S. The critical utilization can be plotted on the vertical axis to find the corresponding critical number of hourly demand hours, $d_c$, provided by autonomous vehicles on the horizontal axis.

In some examples, if an autonomous vehicle fleet is sized to provide $d_c$ hours of service capacity per hour, then the marginal autonomous vehicle can be considered to be at breakeven cost relative to non-autonomous vehicles. Expanding the fleet beyond this point may result in the marginal autonomous vehicle having less than critical utilization and therefore may not be the most economical. Hence, $d_c$ hours of service capacity per hour can be considered the optimal fleet size. This can correspond to $d_c$ vehicles if autonomous vehicles have no downtime due to maintenance or charging, or if these activities can be scheduled during non-peak time.

If no downtime is assumed, then $d_c$ can be equal to the number of autonomous vehicles. The mix of autonomous and non-autonomous vehicles can then be considered as two different time periods. At times with less than $d_c$ hours of service demand, the autonomous vehicle fleet can service the entire demand. At times of the year with service-hour demand d greater than $d_c$, the demand can be serviced by a mix of autonomous vehicle and non-autonomous vehicles, with $d_c$ hours supplied by autonomous vehicles and $d-d_c$ hours supplied by non-autonomous vehicles.

The total number of autonomous vehicle-serviced service-hours per hour can be calculated as set forth in Equation 3:

$$H_{av} = \int_0^{d_c} (1 - F(x))dx \qquad \text{Equation 3}$$

The total number of non-autonomous vehicle serviced service-hours per hour can be calculated as set forth in Equation 4:

$$H_p = \int_{d_c}^{\infty} (1 - F(x))dx \qquad \text{Equation 4}$$

An average cost-per-mile can be computed by taking the blended cost-per-mile for non-autonomous vehicle serviced requests and autonomous vehicle serviced requests. The total hourly cost of non-autonomous vehicle serviced service requests can be calculated as set forth in Equation 5:

$$TC_p = m_p(n(\underline{A}) + H_{av}/a) \qquad \text{Equation 5}$$

In Equation 5, a is the number of on-service-hours per service mile (so 1/a is the number of miles per service-hour, or average service speed). The total hourly cost of autonomous vehicle serviced requests can be calculated as set forth in Equation 6:

$$TC_{av} = m_{av}H_{av}/a + h_{av}d_c \qquad \text{Equation 6}$$

The average cost-per-mile for the mixed service using non-autonomous and autonomous vehicles can be calculated as set forth in Equation 7:

$$c = (TC_p + TC_{av})/n(T) \qquad \text{Equation 7}$$

In some cases, the demand hours per hour may be close to a uniform distribution. If it is assumed that a distribution F (x) is uniform then the distribution can be set forth as shown in Equation 8:

$$F(x) = x/(2\mu) \qquad \text{Equation 8}$$

In Equation 8, u is the mean demand (mean number of demand hours per hour). For the uniform distribution, the critical fleet size can be calculated as set forth in Equation 9:

$$d_c = 2\mu(1 - \rho_c) \qquad \text{Equation 9}$$

For the uniform distribution, the number of non-autonomous vehicle-serviced service-hours per hour can be calculated as set forth in Equation 10:

$$H_p = \mu\rho^2 \qquad \text{Equation 10}$$

For the uniform distribution, the number of autonomous vehicle-serviced service-hours per hour can be calculated as set forth in Equation 11:

$$H_{av} = \mu(1 - \rho^2) \qquad \text{Equation 11}$$

Figure 12:
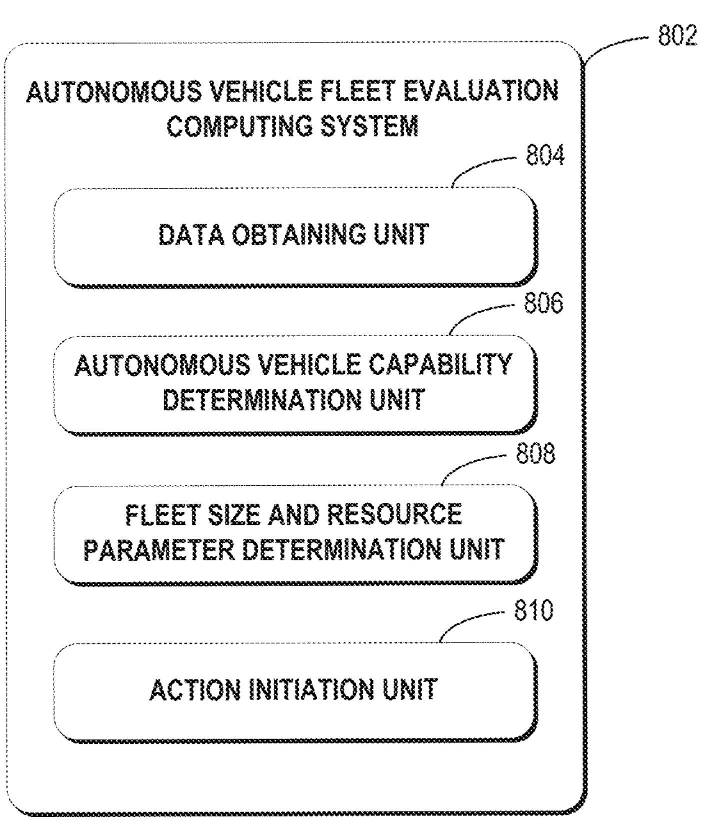
FIG. 12 depicts example system units for performing operations and functions according to example embodiments of the present disclosure.

Various means can be configured to perform the methods and processes described herein. FIG. 12 depicts an example of a computing environment including example means for performing the methods and processes described herein. For example, an autonomous vehicle fleet evaluation computing system 802 can include data obtaining unit(s) 804, autonomous vehicle (AV) capability determination unit(s) 806, fleet size and resource parameter determination unit(s) 808, action initiation unit(s) 810, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware. By way of example, the various means depicted in FIG. 12 may include vehicle computing system 100 of FIG. 1 or operations computing system 200 of FIG. 2.

The means can be programmed to perform one or more algorithm(s) for carrying out the operations and functions described herein. For instance, the data obtaining unit 804 can be configured to obtain data indicative of one or more capabilities of at least one autonomous vehicle and/or data indicative of vehicle service dynamics in an operational domain over a period of time (e.g., via an accessible memory). In some implementations, the means can be configured to determine a plurality of resource performance parameters respectively for a plurality of autonomous vehicle fleets associated with potential deployment in the operational domain. A fleet size and resource parameter determination unit 808 is one example of a means for determine a plurality of resource performance parameters as described herein. Each autonomous vehicle fleet can be associated with a different number of autonomous vehicles. The resource performance parameter for each autonomous vehicle fleet can be based at least in part on the one or more capabilities of the at least one autonomous vehicle and the vehicle service dynamics in the operational domain. In some implementations, the means can be configured to obtain obtaining data indicative of a resource outflow associated with the at least one autonomous vehicle. A data obtaining unit 804 is one example of a means for obtaining such data as described herein.

The means can be configured to determine a level of addressability of the operational domain based at least in part on the one or more capabilities of the at least one autonomous vehicle and the plurality of potential travel routes within the operational domain of the at least one autonomous vehicle. Autonomous vehicle capability determination unit 806 is one example of a means for determine a level of addressability.

The means (e.g., fleet size and resource parameter determination unit 808) can be configured to determine a plurality of resource performance parameters respectively for a plurality of autonomous vehicle fleets associated with potential deployment in the operational domain, a measure of utilization based at least in part on the one or more capabilities of the least one autonomous vehicle, and/or a fleet size of the first fleet of autonomous vehicles for deployment in the operational domain. For example, the means can be configured to determine the resource performance parameter for each autonomous vehicle fleet based at least in part on the one or more capabilities of the at least one autonomous vehicle and the vehicle service dynamics in the operational domain. The means can be configured to determine a measure of utilization based at least in part on the one or more capabilities of the least one autonomous vehicle, a measure of the resource outflow associated with the first fleet of autonomous vehicles, and a measure of the resource outflow associated with the second fleet of autonomous vehicles. The means can be configured to determine a fleet size of the first fleet of autonomous vehicles for deployment in the operational domain based at least in part on the measure of utilization.

The means can be configured to initiate an action associated with the operational domain based at least in part on the plurality of resource performance parameters. Action initiation unit 810 is one example of a means for initiating an action as described herein. For example, the means can be configured to output data indicative of the plurality of resource parameters (e.g., to a memory, to another computing system, for display on a display device, etc.). The plurality of resource parameters can include measures of resource returns, measures of resource efficiency (e.g., time efficiency, mileage efficiency), measures of breakeven utilization, optimal fleet sizes, etc. Additionally, or alternatively, the means can be configured to determine a prioritization of one or more capabilities and output data indicative of such prioritization (e.g., to a memory, to another computing system, for display on a display device, etc.). Additionally, or alternatively, the means can be configured to generate a ranking of fleets of autonomous vehicles and output data indicative of such a ranking (e.g., to a memory, to another computing system, for display on a display device, etc.). An action initiation unit is a one example of a means for initiating an action based at least in part on a plurality of resource performance parameters as described herein.

FIG. 13 depicts an example computing system 910 according to example embodiments of the present disclosure. The computing system 910 illustrated in FIG. 13 is provided as an example only. The components, systems, connections, and/or other aspects illustrated in FIG. 13 are optional and are provided as examples of what is possible, but not required, to implement the present disclosure. The computing system 910 can represent/correspond to the vehicle computing system, operations computing system, AV fleet evaluation system, and/or other computing systems, devices, units, etc. described herein. The computing system 910 can be communicatively coupled with a remote computing system over one or more network(s).

The computing device(s) 905 of the computing system 910 can include processor(s) 915 and a memory 920. The one or more processors 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, data registrar, etc., and combinations thereof.

The memory 920 can store information that can be accessed by the one or more processors 915. For instance, the memory 920 (e.g., one or more non-transitory computer-readable storage mediums, memory devices) can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 (the computing system 910) to perform operations such as any of the operations and functions of the vehicle computing system 100 (or for which it is configured), one or more of the operations and functions of the vehicle provider computing systems (or for which it is configured), one or more of the operations and functions of the operations computing systems described herein (or for which it is configured), one or more of the operations and functions of the AV fleet evaluation system (or for which it is configured) one or more operations and functions for evaluating and determining fleets of autonomous vehicles, one or more portions of methods 600 or 650, and/or one or more of the other operations and functions of the computing systems described herein.

The memory 920 can store data 930 that can be obtained (e.g., acquired, received, retrieved, accessed, created, stored, etc.). The data 930 can include, for instance, any of the data/information described herein such as, for example, data indicative of one or more capabilities of an autonomous vehicle, data indicative of operational domain(s), data indicative of potential travel routes, information associated with operational domain(s), data indicative of vehicle service dynamics, data indicative of levels of addressability, data indicative of prioritizations, data indicative of rankings, outputs, and/or other data/information. In some implementations, the computing device(s) 905 can obtain data from one or more memories that are remote from the computing system 910.

The computing device(s) 905 can also include a communication interface 940 used to communicate with one or more other system(s) of the computing system 910 and/or a remote computing device that is remote from the computing system 910. The communication interface 940 can include any circuits, components, software, etc. for communicating via one or more networks. The communication interface 940 can include, for example, one or more of a communications controller, receiver, transceiver, transmitter, port, conductors, software and/or hardware for communicating data.

The network(s) utilized by the computing system 910 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) can be accomplished, for instance, via a communication interface using any type of protocol, protection scheme, encoding, format, packaging, etc.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for determining autonomous vehicle (AV) fleets, comprising:

obtaining, by a computing system comprising one or more computing devices, data indicative of one or more capabilities of at least one AV;

obtaining, by the computing system, data indicative of vehicle service dynamics in an operational domain over a period of time;

determining, by the computing system, one or more resource performance parameters for a vehicle fleet associated with potential deployment in the operational domain, the one or more resource performance parameters being based at least in part on the one or more capabilities of the at least one AV and the vehicle service dynamics in the operational domain;

determining, by the computing system, a measure of breakeven utilization for the vehicle fleet, the measure of breakeven utilization being based at least in part on a number of AVs having a total resource outflow per unit that is equal to a total resource outflow per unit for a fleet of non-autonomous vehicles; and initiating, by the computing system, an action associated with the operational domain based at least in part on the one or more resource performance parameters, the action resulting in the at least one AV utilizing one or more sensors of the at least one AV to autonomously navigate the at least one AV along a route to at least one location by controlling one or more vehicle controls.

2. The computer-implemented method of claim 1, wherein:

the one or more resource performance parameters include a plurality of measures of resource return, respectively, for the vehicle fleet, the vehicle fleet comprising one or more AVs and one or more non-autonomous vehicles.

3. The computer-implemented method of claim 2, wherein:

the measure of resource return for the vehicle fleet is a measure of fleet-level return, the action resulting in the at least one AV generating a motion plan and executing the motion plan.

4. The computer-implemented method of claim 2, wherein:

the measure of resource return is a measure of marginal resource return associated with individual vehicles of the vehicle fleet.

5. The computer-implemented method of claim 1, wherein:

the one or more resource performance parameters include a plurality of measures of efficiency for the vehicle fleet.

6. The computer-implemented method of claim 5, wherein:

the measure of efficiency includes a measure of time efficiency associated with the vehicle fleet.

7. The computer-implemented method of claim 5, wherein:

the measure of efficiency includes a measure of predicted mileage efficiency.

8. The computer-implemented method of claim 1, further comprising:

obtaining, by the computing system, data indicative of a resource outflow associated with the at least one AV.

9. The computer-implemented method of claim 8, wherein the resource outflow is based on at least one of operation or deployment of the at least one AV.

10. The computer-implemented method of claim 1, wherein:

the data indicative of vehicle service dynamics includes data indicative of usage associated with one or more vehicle service types.

11. The computer-implemented method of claim 10, wherein:

the usage includes a supply and a demand associated with the one or more vehicle service types.

12. The computer-implemented method of claim 1, further comprising:

obtaining, by the computing system, data associated with a plurality of potential travel routes within the operational domain of the at least one AV.

13. The computer-implemented method of claim 12, further comprising:

determining, by the computing system, a level of addressability of the operational domain based at least in part on the one or more capabilities of the at least one AV and the plurality of potential travel routes within the operational domain of the at least one AV, wherein the one or more resource performance parameters are based at least in part on the level of addressability of the operational domain.

14. The computer-implemented method of claim 13, further comprising:

determining data indicative of vehicle service requests that are serviceable by the at least one AV in the operational domain based on the plurality of potential travel routes and the vehicle service dynamics;

wherein the one or more resource performance parameters are based at least in part on the vehicle service requests that are serviceable by the at least one AV.

15. The computer-implemented method of claim 1, wherein the one or more capabilities of the at least one AV are indicative of at least one of an ability of the at least one AV to operate in a weather condition, a vehicle operating condition, or a vehicle maneuverability.

16. The computer-implemented method of claim 1, wherein initiating, by the computing system, the action comprises:

generating, by the computing system, data indicative of the one or more resource performance parameters; and outputting, by the computing system, the data indicative of the one or more resource performance parameters.

17. The computer-implemented method of claim 1, wherein:

the one or more resource performance parameters include a first one or more resource performance parameters based on a first profile, the first profile including at least one of a first set of capabilities of the at least one AV or a first set of vehicle service dynamics.

18. The computer-implemented method of claim 17, wherein;

the one or more resource performance parameters include a second one or more resource performance parameters based on a second profile, the second profile including at least one of a second set of capabilities of the at least one AV or a second set of vehicle service dynamics.

19. A computing system comprising:

one or more processors; and one or more tangible, non-transitory, computer-readable media that collectively store instructions that when executed by the one or more processors cause the computing system to perform operations comprising:

obtaining data indicative of one or more capabilities of at least one autonomous vehicle (AV);

obtaining data indicative of vehicle service dynamics in an operational domain over a period of time;

determining one or more resource performance parameters for a vehicle fleet associated with potential deployment in the operational domain, the one or more resource performance parameters being based at least in part on the one or more capabilities of the at least one AV and the vehicle service dynamics in the operational domain;

determining a measure of breakeven utilization for the vehicle fleet, the measure of breakeven utilization being based at least in part on a number of AVs having a total resource outflow per unit that is equal to a total resource outflow per unit for a fleet of non-autonomous vehicles; and initiating an action associated with the operational domain based at least in part on the one or more resource performance parameters, the action resulting in the at least one AV utilizing one or more sensors of the at least one AV to autonomously navigate the at least one AV along a route to at least one location by controlling one or more vehicle controls.

20. One or more tangible, non-transitory, computer-readable media that collectively store instructions that, when executed by one or more processors, cause the one or more processors to perform operations, the operations comprising:

obtaining data indicative of one or more capabilities of at least one autonomous vehicle (AV);

obtaining data indicative of vehicle service dynamics in an operational domain over a period of time;

determining one or more resource performance parameters for a vehicle fleet associated with potential deployment in the operational domain, the one or more resource performance parameters being based at least in part on the one or more capabilities of the at least one AV and the vehicle service dynamics in the operational domain;

determining a measure of breakeven utilization for the vehicle fleet, the measure of breakeven utilization being based at least in part on a number of AVs having a total resource outflow per unit that is equal to a total resource outflow per unit for a fleet of non-autonomous vehicles; and initiating an action associated with the operational domain based at least in part on the one or more resource performance parameters, the action resulting in the at least one AV utilizing one or more sensors of the at least one AV to autonomously navigate the at least one AV along a route to at least one location by controlling one or more vehicle controls.

* * * * *